US012640498B2

(12) United States Patent
Hara et al.

(10) Patent No.: US 12,640,498 B2
(45) Date of Patent: May 26, 2026

(54) ANTENNA DEVICE

(71) Applicant: YOKOWO CO., LTD., Tokyo (JP)

(72) Inventors: Bunpei Hara, Tomioka (JP); Seiya Hiroki, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 52 days.

(21) Appl. No.: 18/268,981

(22) PCT Filed: Dec. 22, 2021

(86) PCT No.: PCT/JP2021/047744
§ 371 (c)(1),
(2) Date: Jun. 22, 2023

(87) PCT Pub. No.: WO2022/138785
PCT Pub. Date: Jun. 30, 2022

(65) Prior Publication Data

US 2024/0047897 A1 Feb. 8, 2024

Related U.S. Application Data

(60) Provisional application No. 63/170,043, filed on Apr. 2, 2021.

(30) Foreign Application Priority Data

Dec. 23, 2020 (JP) ................................ 2020-213149

(51) Int. Cl.
*H01Q 21/24* (2006.01)
*H01Q 1/32* (2006.01)
(Continued)

(52) U.S. Cl.
CPC ............... *H01Q 21/24* (2013.01); *H01Q 1/32* (2013.01); *H01Q 15/14* (2013.01); *H01Q 19/10* (2013.01)

(58) Field of Classification Search
CPC ........ H01Q 1/32; H01Q 1/3275; H01Q 5/385; H01Q 15/14; H01Q 19/10; H01Q 19/26; H01Q 19/32; H01Q 21/24
See application file for complete search history.

(56) References Cited

U.S. PATENT DOCUMENTS 10,074,895 B2 9/2018 Sugimoto et al.
10,749,267 B2 8/2020 Sone
(Continued)

FOREIGN PATENT DOCUMENTS

EP 3627623 A1 * 3/2020 ........... H01Q 9/0407
JP S60189144 U 12/1985
(Continued)

OTHER PUBLICATIONS

International Search Report and Written Opinion mailed on Mar. 15, 2022, received for PCT Application PCT/JP2021/047744, filed on Dec. 22, 2021, 10 pages including English Translation.
(Continued)

*Primary Examiner* — Hoang V Nguyen
(74) *Attorney, Agent, or Firm* — XSENSUS LLP

(57) ABSTRACT

An antenna device (100) for a vehicle includes an antenna case (101), an antenna base (102) forming an accommodation space together with the antenna case (101), a first antenna element (108) that is accommodated in the accommodation space and that at least transmits or receives a circularly polarized wave; a second antenna element (110) that is arranged close to the first antenna element (108) and that at least transmits or receives a linearly polarized wave; and at least one parasitic element (111), (112*a*), (112*b*), or (112*c*) serving as a reflector or a waveguide for the second antenna element (110).

17 Claims, 33 Drawing Sheets

(51) Int. Cl.

| | |
|---|---|
| ***H01Q 15/14*** | (2006.01) |
| ***H01Q 19/10*** | (2006.01) |

(56) References Cited

U.S. PATENT DOCUMENTS

| | | | | |
|---|---|---|---|---|
| 10,978,794 | B2 | 4/2021 | Terashita et al. | |
| 11,271,293 | B2 | 3/2022 | Yoshioka | |
| 11,450,948 | B2 | 9/2022 | Terashita et al. | |
| 2012/0188143 | A1 | 7/2012 | Yang et al. | |
| 2017/0077594 | A1* | 3/2017 | Sugimoto | H01Q 15/14 |
| 2017/0077596 | A1 | 3/2017 | Ortigosa et al. | |
| 2018/0109006 | A1 | 4/2018 | Ng et al. | |
| 2019/0273310 | A1* | 9/2019 | Sone | H01Q 21/205 |
| 2019/0280372 | A1 | 9/2019 | Terashita et al. | |
| 2020/0388909 | A1* | 12/2020 | Yoshioka | H01Q 9/045 |
| 2021/0194113 | A1 | 6/2021 | Terashita et al. | |
| 2021/0296790 | A1 | 9/2021 | Kobayashi et al. | |
| 2022/0376385 | A1 | 11/2022 | Terashita et al. | |

FOREIGN PATENT DOCUMENTS

| | | | |
|---|---|---|---|
| JP | 2018186360 | A | 11/2018 |
| JP | 2020065249 | A | 4/2020 |
| JP | 2020-198593 | A | 12/2020 |
| JP | 2021136531 | A | 9/2021 |
| WO | 2015/125426 | A1 | 8/2015 |
| WO | 2016019784 | A1 | 2/2016 |
| WO | 2017/213243 | A1 | 12/2017 |
| WO | 2018/105235 | A1 | 6/2018 |
| WO | 2020/121748 | A1 | 6/2020 |

OTHER PUBLICATIONS

Extended European search report issued on Dec. 10, 2024, in corresponding European patent Application No. 21910925.3, 9 pages.

International Search Report mailed Jun. 28, 2022 in International Application No. PCT/JP2022/015403. (2 pgs).

Extended European Search Report issued Feb. 18, 2025 in European Application No. 22780910.0 (10 pgs).

* cited by examiner

Θ =90 [deg] (SOLID LINE: EXAMPLE 1, DOTTED LINE: EXAMPLE 2, ONE-DOT CHAIN LINE: COMPARATIVE EXAMPLE)

ANTENNA DEVICE

CROSS-REFERENCE TO RELATED APPLICATIONS

The present application is based on PCT filing PCT/JP2021/047744, filed Dec. 22, 2021, which claims priority to U.S. Provisional Patent Application No. 63/170,043, filed Apr. 2, 2021, and Japanese Patent Application No. 2020-213149, filed Dec. 23, 2020, the entire disclosure of each is incorporated herein.

TECHNICAL FIELD

The present invention relates to an antenna device.

BACKGROUND ART

In the related art, as an antenna device to be mounted on a vehicle or the like, a small and thin antenna device for a vehicle to be mounted on a roof of the vehicle is known.

In recent years, it is required for an antenna device for a vehicle to include a plurality of antennas for receiving and transmitting signals in various frequency bands such as signals for acquiring positional information and signals for being adapted to advanced driver-assistance systems (ADAS), in addition to signals for radio broadcasting and signals for terrestrial digital broadcasting.

For example, Patent Document 1 discloses an antenna device including a first antenna unit for receiving AM/FM signals, a second antenna unit that is a cellular antenna, and a third antenna unit for receiving GNSS signals, in order to respond to signals in various frequency bands.

RELATED DOCUMENT

Patent Document

[Patent Document 1] International Publication No. 2020/121748

SUMMARY OF THE INVENTION

Technical Problem

A multi-band antenna device for a vehicle, such as the antenna device of Patent Document 1, which is equipped with a plurality of types of antenna elements corresponding to different frequency bands has become mainstream.

However, in a case where a plurality of types of antenna elements corresponding to different frequency bands are mounted in an accommodation space of a small and thin antenna device for a vehicle, the antenna elements need to be arranged close to each other, and it is difficult to ensure isolation between them. Therefore, it may be difficult to obtain good antenna characteristics.

One of objects of the present invention is to obtain good antenna characteristics while arranging a plurality of antenna elements close to each other in a narrow space in a small antenna device.

Solution to Problem

An aspect of the present invention is an antenna device including: a case; a base forming an accommodation space together with the case; a first antenna element that is accommodated in the accommodation space and that at least transmits or receives a circularly polarized wave; a second antenna element that is arranged close to the first antenna element and that at least transmits or receives a linearly polarized wave; and at least one parasitic element serving as a reflector or a waveguide for the second antenna element.

Advantageous Effects of Invention

According to the aspect of the present invention, it is possible to obtain good antenna characteristics while arranging a plurality of antenna elements close to each other in a narrow space in a small antenna device.

DESCRIPTION OF EMBODIMENTS

An embodiment of the present invention will be described below with reference to the drawings. In addition, in all the drawings, the same constituent elements are denoted by the same reference signs, and the description thereof will not be repeated as appropriate.

In this specification, unless otherwise specified, ordinal numbers such as "first", "second", "third", and the like are added merely to distinguish similarly termed configurations and do not imply any particular feature (for example, an order or importance) of the configurations.

Embodiment

An antenna device for a vehicle (hereinafter also simply referred to as "antenna device") 100 according to an embodiment of the present invention is a device that is attached to a roof of a vehicle and that at least transmits or receives radio waves in a plurality of different frequency bands. In the present embodiment, an example of the antenna device 100 that at least transmits or receives three types of radio waves will be described, but the number of types of radio waves transmitted or received by the antenna device may be two or more.

Figure 1:
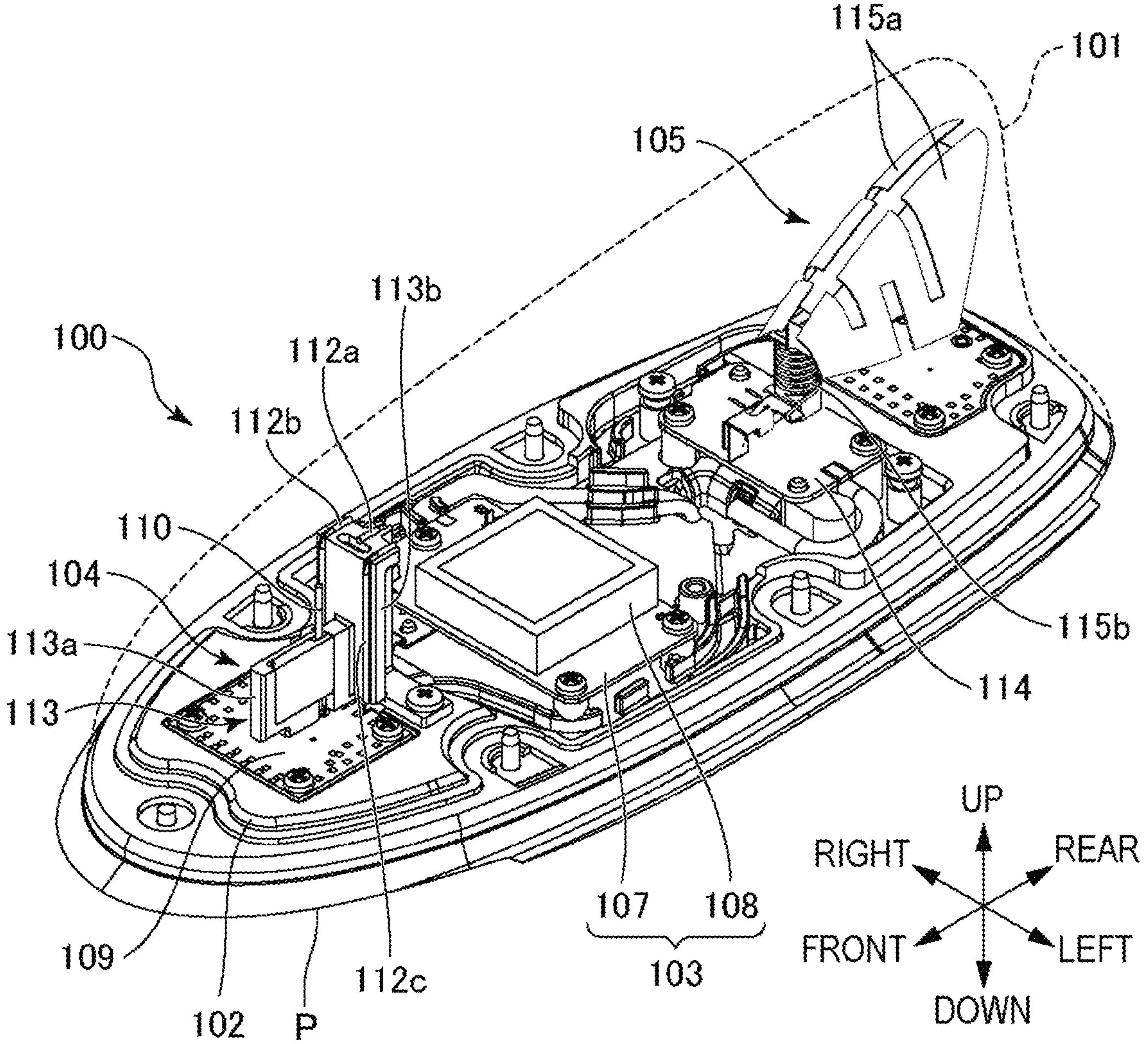
FIG. 1 is a perspective view of an antenna device for a vehicle according to an embodiment of the present invention.
Figure 2:
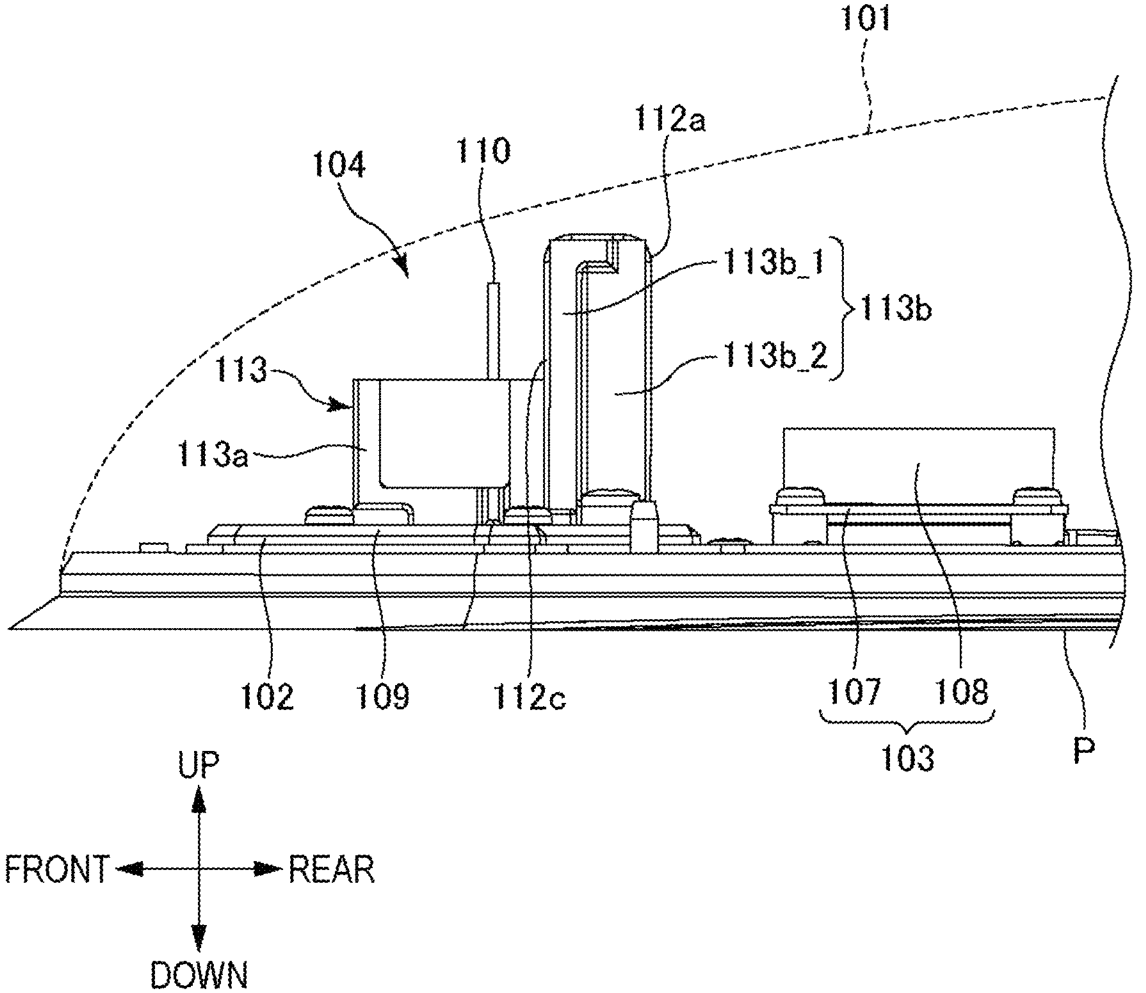
FIG. 2 is a left side view showing an enlarged front portion of the antenna device for a vehicle according to the embodiment.

As shown in the perspective view of FIG. 1 and the left side view of the front portion of FIG. 2, the antenna device 100 for a vehicle includes an antenna case 101, an antenna base 102, a first antenna unit 103, a second antenna unit 104, and a third antenna unit 105. Further, in FIGS. 1 and 2, the antenna case 101 is depicted as transparent.

In FIG. 1, "front" or "front side" refers to a front side of a vehicle to which the antenna device 100 is attached, and "rear" or "rear side" refers to an opposite side thereof, that is, a rear side of the vehicle. "Right" or "right side" is a right side as seen by a driver of the vehicle, and "left" or "left side" is an opposite side thereof. "Lower" or "lower side" is a direction of gravity of the vehicle to which the antenna device 100 is attached, and "upper" or "upper side" is an opposite direction thereof.

These terms indicating directions are used in the same manner as above in the following description and drawings, but they are used for the purpose of description and are not intended to limit the present invention.

The antenna case 101 is a hollow member made of synthetic resin (for example, ABS resin) having radio wave transmittance. The antenna case 101 is a case that forms an accommodation space together with the antenna base 102 by covering the antenna base 102 as a base from above. The antenna case 101 has a shark fin-like outer shape, and the accommodation space increases in width and height from the front side to the rear side. Therefore, the accommodation space is wider in the rear portion than in the front portion. Here, the width is a length in a left-right direction, and the height is a length in an up-down direction.

Regarding outer dimensions of the antenna case 101, for example, a length in a front-rear direction is about 190 mm to 200 mm, a length in the up-down direction is about 60 mm to 65 mm, and a length in the left-right direction is about 70 mm to 75 mm.

The antenna base 102 includes a conductive base which, when mounted on the roof of the vehicle, is grounded by conducting with the roof with a pad P interposed therebetween. The antenna base 102 may be composed only of a conductive base, but may be composed of an insulating base and a conductive base, an insulating base and a metal plate, or an insulating base, a conductive base, and a metal plate. Further, the conductive base may be composed of a plurality of electrically connected or divided components and an insulating base that holds the components.

The first antenna unit 103, the second antenna unit 104, and the third antenna unit 105 are fixed to the antenna base 102.

The second antenna unit 104, the first antenna unit 103, and the third antenna unit 105 according to the present embodiment are arranged in the accommodation space by being attached to the antenna base 102 in order from the front side. In the present embodiment, the second antenna unit 104 is arranged at the front side of the accommodation space, but may be arranged at the center or rear side of the accommodation space.

The first antenna unit 103 includes a first board 107 and a first antenna element 108.

The first board 107 is a board fixed to the antenna base 102, and is, for example, a PCB (Printed Circuit Board).

The first antenna element 108 is provided on the first board 107. The first antenna element 108 is an antenna element that receives radio waves for a GNSS (Global Navigation Satellite System) and includes a patch antenna.

The radio wave for GNSS is an example of a circularly polarized wave. The first antenna element 108 may at least transmit or receive circularly polarized waves. The radio waves are not limited to radio waves for GNSS and may be, for example, radio waves for SDARS (Satellite Digital Audio Radio Service). Further, the first antenna element 108 may be replaced with a plurality of circularly polarized antennas or may be a single antenna that supports a plurality of frequency bands.

Figure 3:
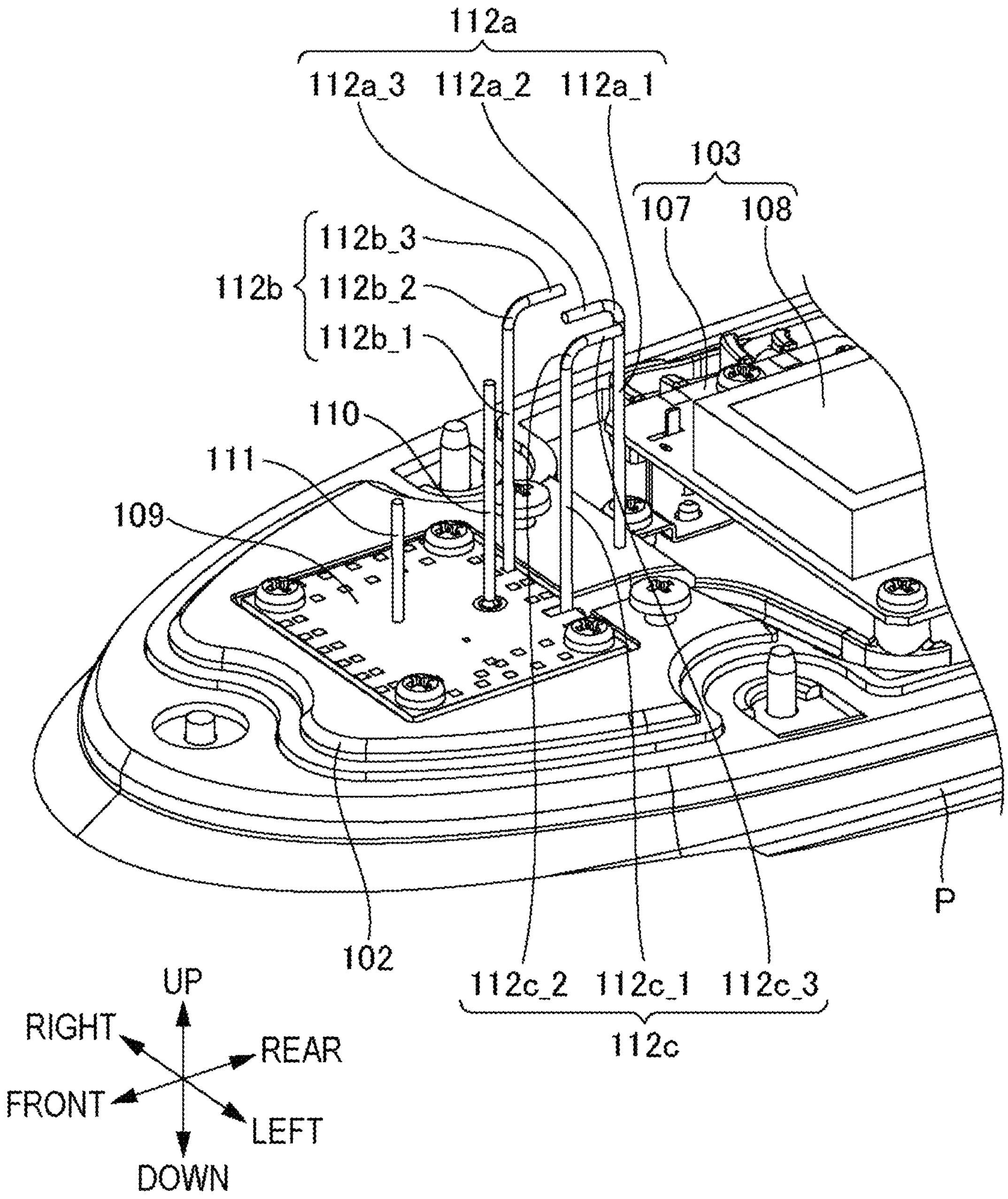
FIG. 3 is an enlarged perspective view of the vicinity of a second antenna unit in a state in which a resin holder is removed, according to the embodiment.

As shown in FIGS. 2 and 3, the second antenna unit 104 includes a second board 109, a second antenna element 110, a first parasitic element 111, second parasitic elements **112*a* to 112*c*, and a resin holder 113. FIG. 3 is an enlarged perspective view of the vicinity of the second antenna unit 104 in a state where the resin holder 113 is removed. In FIGS. 1 and 2, since the first parasitic element 111 is arranged inside the resin holder 113, the first parasitic element 111** is not represented in the drawings.

The second board 109 is a board fixed to the antenna base 102 and is, for example, a PCB. The second antenna element 110, the first parasitic element 111, the second parasitic elements **112*a* to 112*c*, and the resin holder 113 are provided on the second board 109** and fixed.

The second antenna element 110 is an antenna element that at least transmits or receives radio waves for V2X (Vehicle-to-Everything), and is powered through the circuit of the second board 109.

The second antenna element 110 is arranged so as to be close to the first antenna element 108 by being accommodated in the accommodation space.

In addition, the radio wave for V2X is an example of a vertically polarized wave that is a linearly polarized wave. The second antenna element 110 may at least transmit or receive vertically polarized waves. The radio waves are not limited to radio waves for V2X and may be, for example, vertically polarized waves for DTV (Digital TV).

In the present embodiment, the second antenna element 110 is a monopole antenna and is composed of a linear conductor erected on the second board 109. Since radio waves for V2X are typically in the 5.9 GHz band, a length of the second antenna element 110 is approximately a ½ wavelength (about 25 mm) of a wavelength of the vertically polarized wave for V2X.

The length of the second antenna element 110 may be a ¼ wavelength (about 12.5 mm). Further, the second antenna element 110 is not limited to a monopole antenna and may be a dipole antenna, a sleeve antenna, or the like. Furthermore, the second antenna element 110 is not limited to a linear conductor. The second antenna element 110 may be composed of conductors of various shapes such as sheet metal or may be composed of a linear circuit provided on a board. Moreover, the linear shape is not limited to a straight shape and may include a curved or bent shape.

The first parasitic element 111 and the second parasitic elements **112*a* to 112*c* are parasitic elements that function as reflectors or waveguides to give a forward directivity to the second antenna element 110**.

In addition, the directivity of the second antenna element 110 by the parasitic elements 111, and **112*a* to 112*c* is not limited to the forward direction and may be any direction away from the first antenna element 108**, such as a left-right direction, a forward left direction, a forward right direction or a forward upward direction.

The first parasitic element 111 and the second parasitic elements 112*a* to 112*c* are composed of ungrounded linear conductors provided on the second board 109.

Each of the first parasitic element 111 and the second parasitic elements 112*a* to 112*c* is ungrounded and has a total length which is ½ or less of a wavelength (in the present embodiment, about 190 mm) of the circularly polarized wave transmitted or received by the first antenna element 108, preferably 3/10 or less of the wavelength of the circularly polarized wave.

Here, each of the parasitic elements 111, and 112*a* to 112*c* serves as a wave source, which may deteriorate the antenna characteristics (axial ratio and the like) of the first antenna element 108. The influence of the ungrounded parasitic elements 111, and 112*a* to 112*c* on the first antenna element 108, which is a circularly polarized antenna, was simulated by a model shown in FIGS. 4 to 6.

Figure 4:
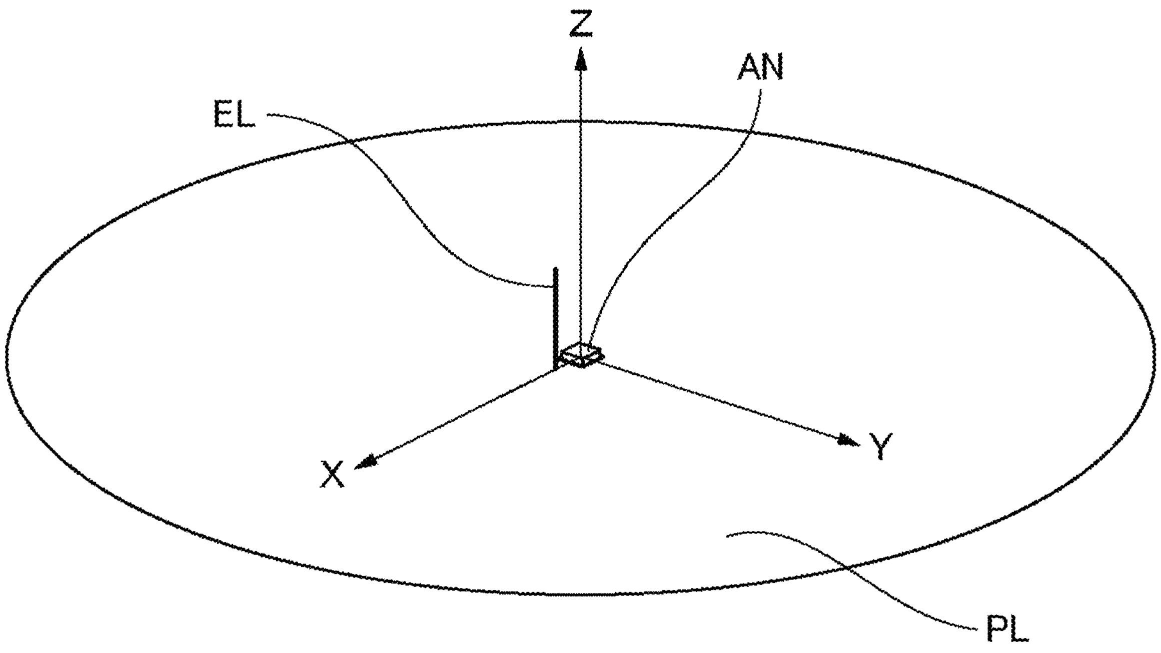
FIG. 4 is a perspective view showing an arrangement relationship between a circularly polarized antenna and a parasitic element in a model adopted in a simulation for verifying an influence of the parasitic element on the circularly polarized antenna.
Figure 5:
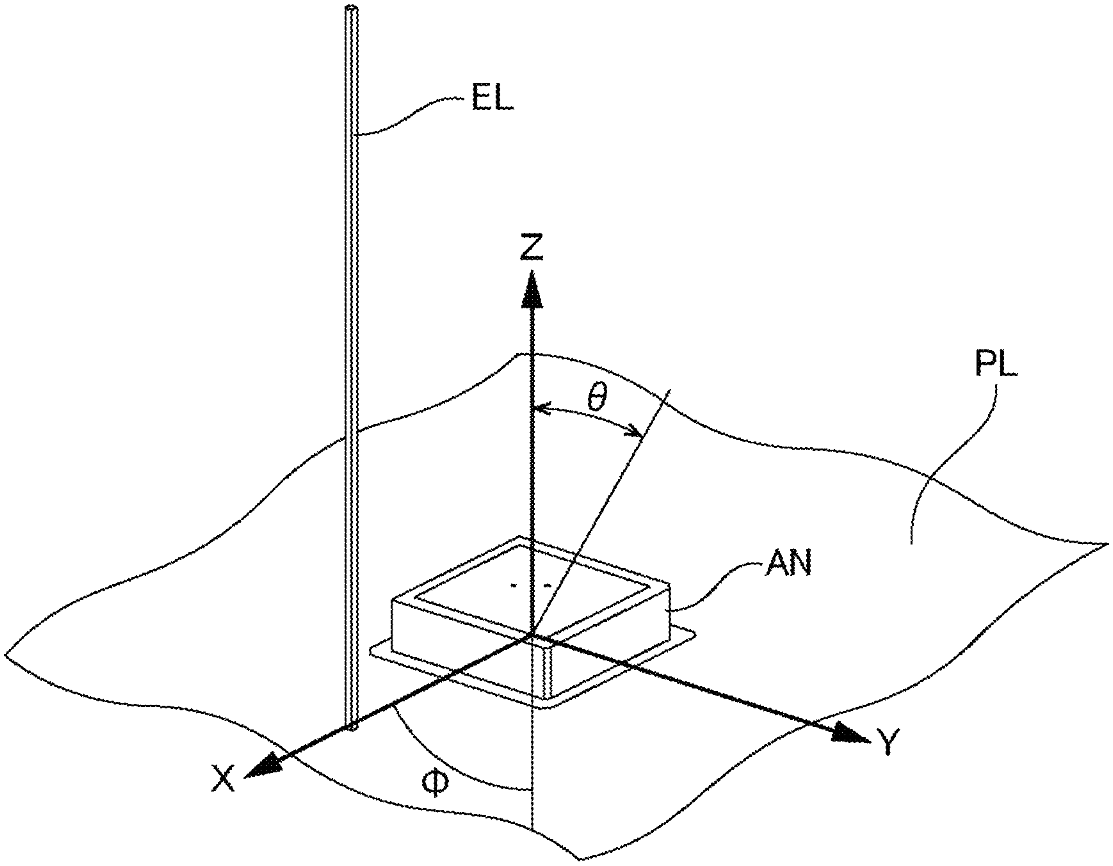
FIG. 5 is an enlarged view of the vicinity of the circularly polarized antenna shown in FIG. 4.
Figure 6:
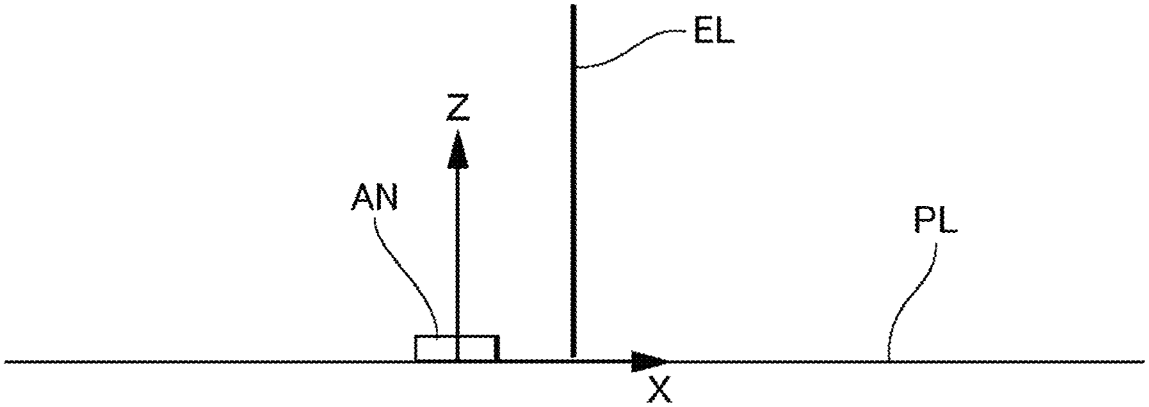
FIG. 6 is a side view of the vicinity of the circularly polarized antenna shown in FIG. 4.

FIG. 4 is a perspective view showing an arrangement relationship between a circularly polarized antenna and a parasitic element in a model adopted in a simulation for verifying an influence of the parasitic element on the circularly polarized antenna. FIG. 5 is an enlarged view of the vicinity of the circularly polarized antenna AN shown in FIG. 4. FIG. 6 is a side view of the vicinity of the circularly polarized antenna AN shown in FIG. 4 as seen from a positive direction of a Y-axis.

In FIGS. 4 to 6, an XY plane including an X-axis and a Y-axis perpendicular to each other is parallel to a circular ground plate PL. A direction from the center of the circularly polarized antenna AN toward the parasitic element EL is a positive direction of the X-axis, and a right side when viewed from the positive direction of the X-axis is the positive direction of the Y-axis. Further, an axis passing through the center of the circular ground plate PL and perpendicular to the circular ground plate PL is a Z-axis, and a direction in which the circularly polarized antenna AN is positioned with respect to the circular ground plate PL is a positive direction of the Z-axis. Furthermore, θ represents an angle with respect to the Z-axis, and φ represents an angle with respect to the X-axis.

The circular ground plate PL is a circular installed plate with a diameter of 1 [m]. The circularly polarized antenna AN is an antenna provided at the center of the circular ground plate PL, and an operating frequency thereof is 1555 to 1610 MHz. The circularly polarized antenna AN receives right-handed polarized waves. The parasitic element EL is installed in the vicinity of the circularly polarized antenna AN, and a distance between the parasitic element EL and the circularly polarized antenna AN is 20 [mm]. The parasitic element EL is a straight rod-shaped element having a length L [mm] in a Z-axis direction and is not grounded because it is not electrically connected to the circular ground plate PL.

Figure 7:
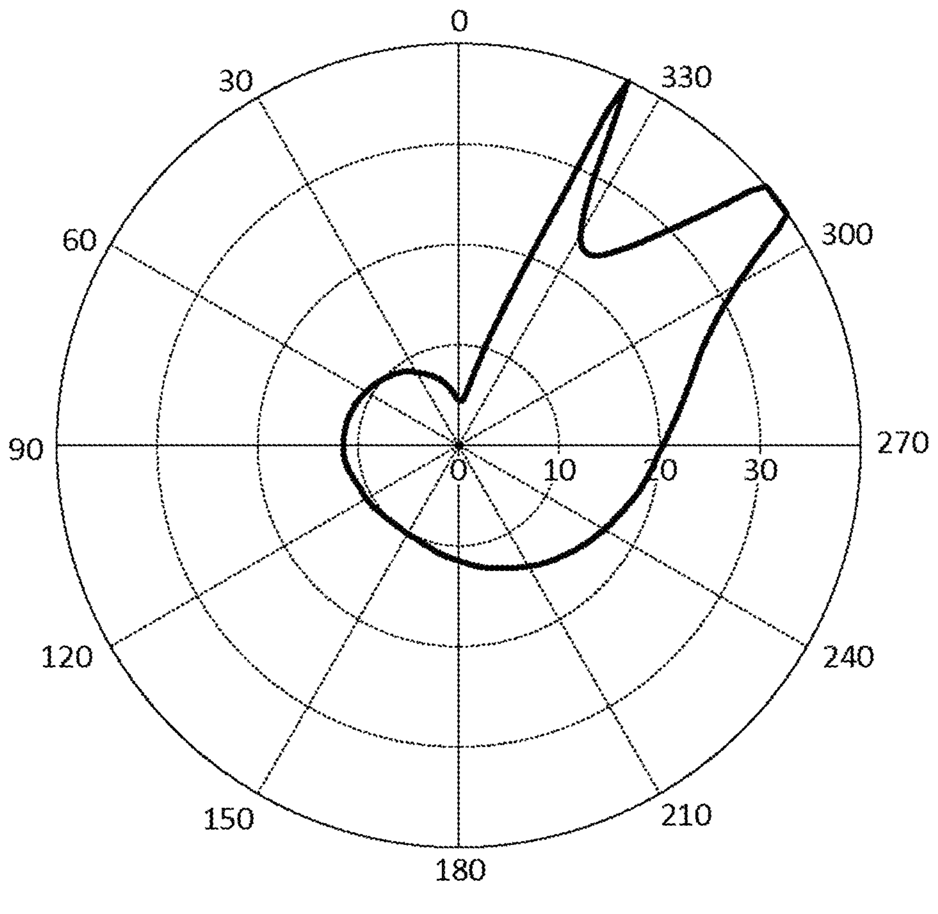
FIG. 7 is a diagram showing a simulation result for the circularly polarized antenna shown in FIG. 4 in a case where a length L of the parasitic element EL in an ungrounded state is 80 [mm], which shows an angular distribution of an axial ratio around an angle $\varphi$ at an angle $\theta=80$ [deg].
Figure 8:
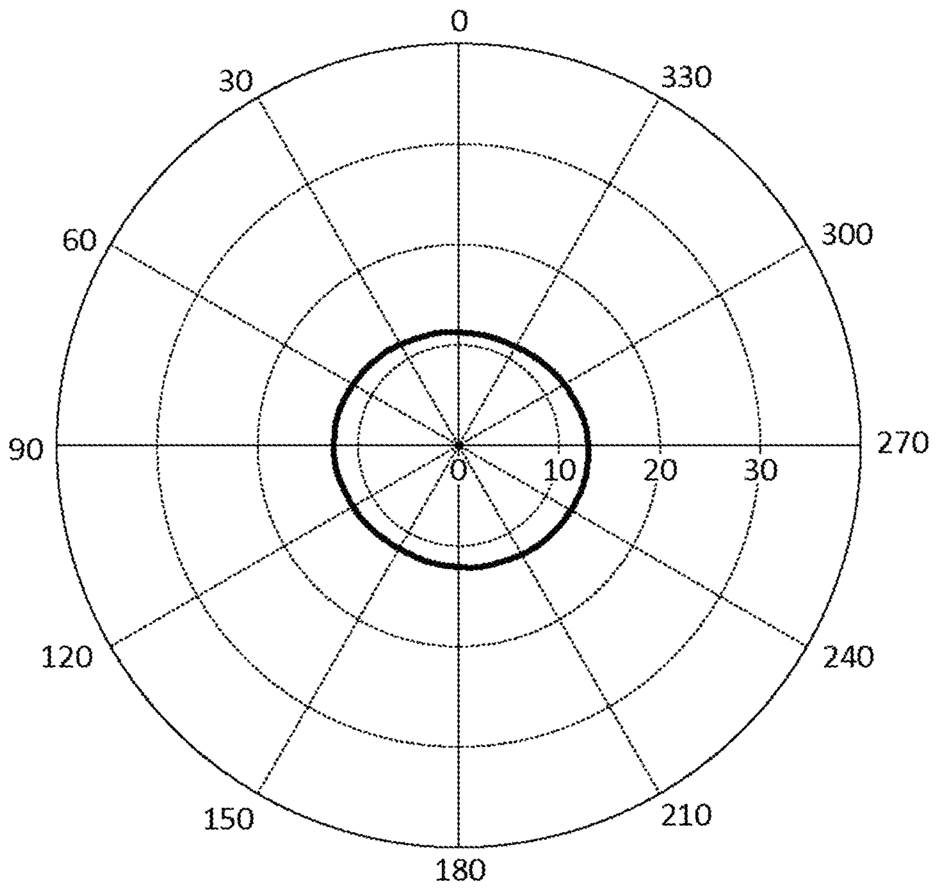
FIG. 8 is a diagram showing a simulation result for the circularly polarized antenna shown in FIG. 4 in a case where the parasitic element EL in an ungrounded state is not provided, which shows an angular distribution of an axial ratio around the angle $\varphi$ at the angle $\theta=80$ [deg].

FIG. 7 is a diagram showing a simulation result for the circularly polarized antenna shown in FIG. 4 in a case where a length L of the parasitic element EL in an ungrounded state is 80 [mm], which shows an angular distribution of an axial ratio around an angle φ at an angle θ=80 [deg]. FIG. 8 is a diagram showing a simulation result for the circularly polarized antenna shown in FIG. 4 in a case where the parasitic element EL in an ungrounded state is not provided, which shows an angular distribution of an axial ratio around the angle φ at the angle θ=80 [deg].

In each of FIGS. 7 and 8, a circumferential direction represents an angle φ [deg]. The distance from the center represents an axial ratio [dB].

As can be seen from a comparison of FIGS. 7 and 8, in a case where the parasitic element EL in an ungrounded state having a length L of 80 [mm] is provided, there is a sharp increase in the axial ratio at a certain angle φ as compared to a case where the parasitic element EL in an ungrounded state is not provided. This suggests that the parasitic element EL affects the axial ratio.

In the simulation, a maximum value of the axial ratio was set to 40 dB, so when the axial ratio is 40 dB or more, the axial ratio is shown as 40 dB in FIGS. 7 and 8. Therefore, when the axial ratio is 40 dB, there is a possibility that the actual axial ratio is 40 dB or more, and this also applies to the following simulation results.

Figure 9:
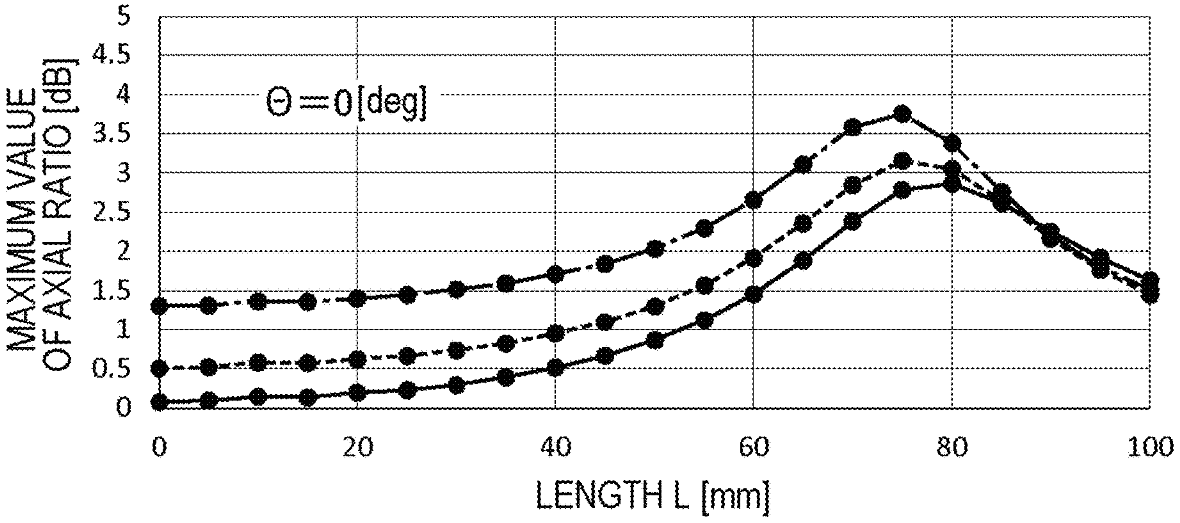
FIG. 9 is a diagram showing a simulation result for the circularly polarized antenna shown in FIG. 4 regarding a relationship between a length L [mm] of the parasitic element EL in an ungrounded state and a maximum value of an axial ratio in an angular distribution of the axial ratio around the angle $\varphi$ at the angle $\theta=0$ [deg].
Figure 10:
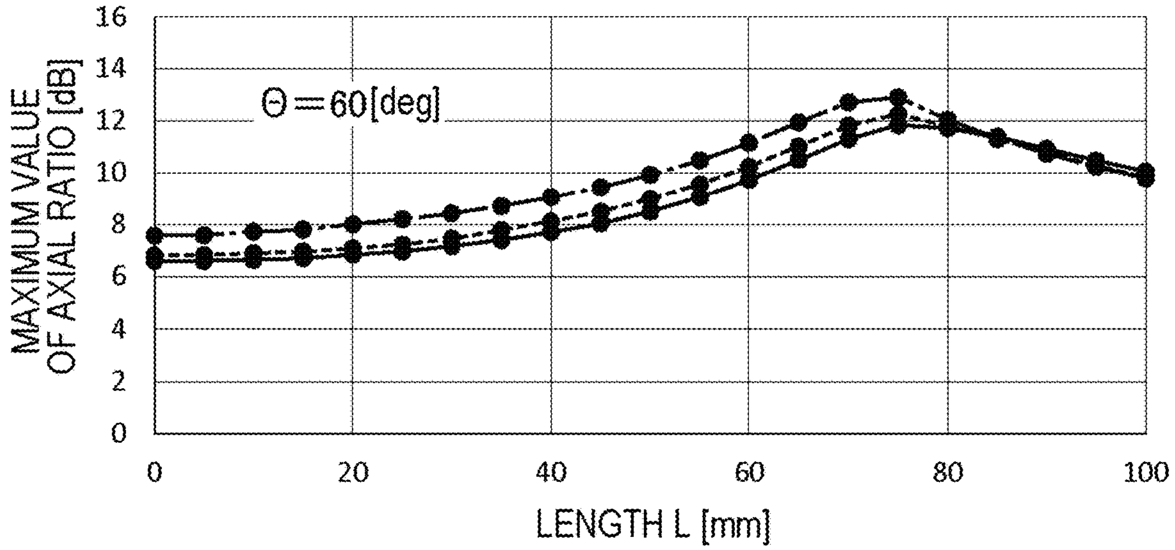
FIG. 10 is a diagram showing a simulation result for the circularly polarized antenna shown in FIG. 4 regarding a relationship between a length L [mm] of the parasitic element EL in an ungrounded state and a maximum value of an axial ratio in an angular distribution of the axial ratio around the angle $\varphi$ at the angle $\theta=60$ [deg].
Figure 11:
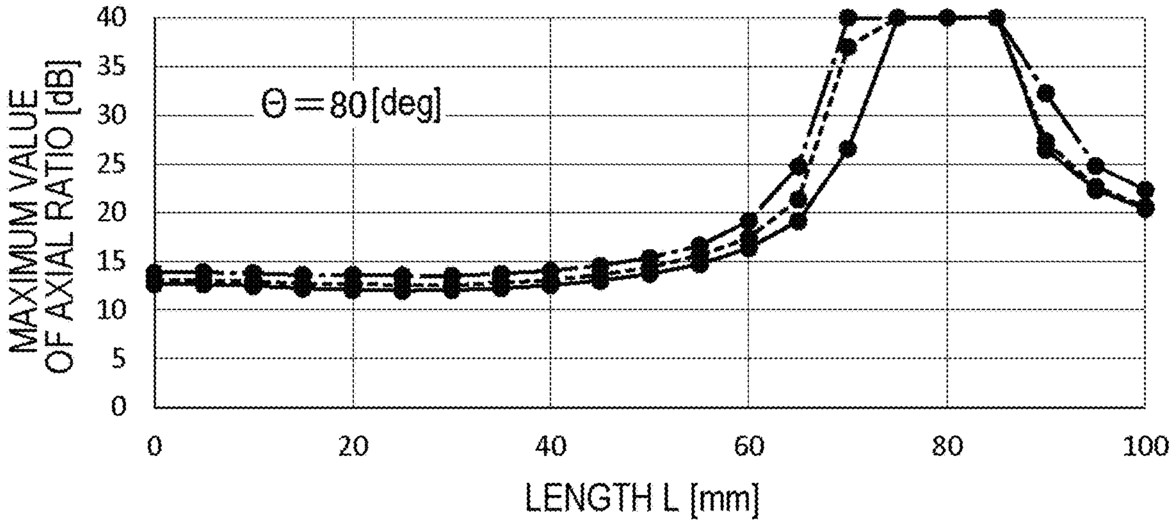
FIG. 11 is a diagram showing a simulation result for the circularly polarized antenna shown in FIG. 4 regarding a relationship between a length L [mm] of the parasitic element EL in an ungrounded state and a maximum value of an axial ratio in an angular distribution of the axial ratio around the angle $\varphi$ at the angle $\theta=80$ [deg].

FIG. 9 is a diagram showing a simulation result for the circularly polarized antenna shown in FIG. 4 regarding a relationship between a length L [mm] of the parasitic element EL in an ungrounded state and a maximum value of an axial ratio in an angular distribution of the axial ratio around the angle φ at the angle θ=0 [deg]. FIG. 10 is a diagram showing a simulation result for the circularly polarized antenna shown in FIG. 4 regarding a relationship between a length L [mm] of the parasitic element EL in an ungrounded state and a maximum value of an axial ratio in an angular distribution of the axial ratio around the angle φ at the angle θ=60 [deg]. FIG. 11 is a diagram showing a simulation result for the circularly polarized antenna shown in FIG. 4 regarding a relationship between a length L [mm] of the parasitic element EL in an ungrounded state and a maximum value of an axial ratio in an angular distribution of the axial ratio around the angle φ at the angle θ=80 [deg].

In each of FIGS. 9 to 11, a horizontal axis represents the length L [mm] of the parasitic element EL. A vertical axis represents the maximum value [dB] of the axial ratio.

Further, in each of FIGS. 9 to 11, a solid line indicates a simulation result when the operating frequency is 1560 MHz. A dotted line indicates a simulation result when the operating frequency is 1575 MHz. A one-dot chain line indicates a simulation result when the operating frequency is 1600 MHz.

As can be seen from FIGS. 9 to 11, as the length L of the parasitic element EL increases from 0 [mm], the maximum value of the axial ratio increases and becomes the largest when the length L is about 80 [mm]. That is, as the length L of the parasitic element EL increases from 0 [mm], the axial ratio deteriorates and becomes worst when the length L is about 80 [mm].

Here, the length L of the parasitic element EL of 80 [mm] corresponds to approximately ½ of wavelengths of the operating frequencies of 1560 MHz, 1575 MHz, and 1600 MHz of the circularly polarized antenna. Therefore, when the parasitic element EL is not grounded, the length L of the parasitic element EL is preferably approximately ½ or less, and more preferably 3/10 or less of the wavelength of the operating frequency of the circularly polarized antenna AN.

Figure 12:
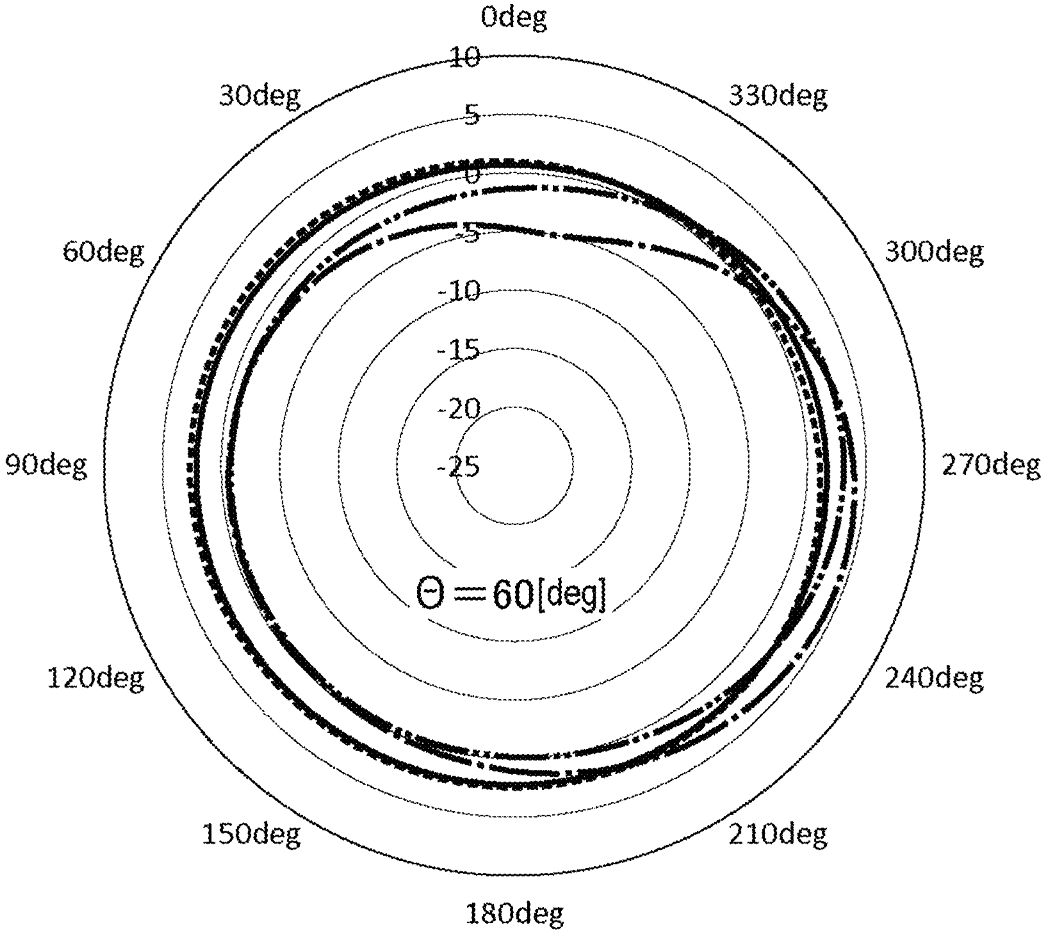
FIG. 12 is a diagram showing a simulation result regarding a directivity of a gain of a circularly polarized wave (right-handed polarized wave) around the angle $\varphi$ at the angle $\theta=60$ [deg] in a case where an operating frequency of the circularly polarized antenna AN shown in FIG. 4 is 1575 MHz.
Figure 13:
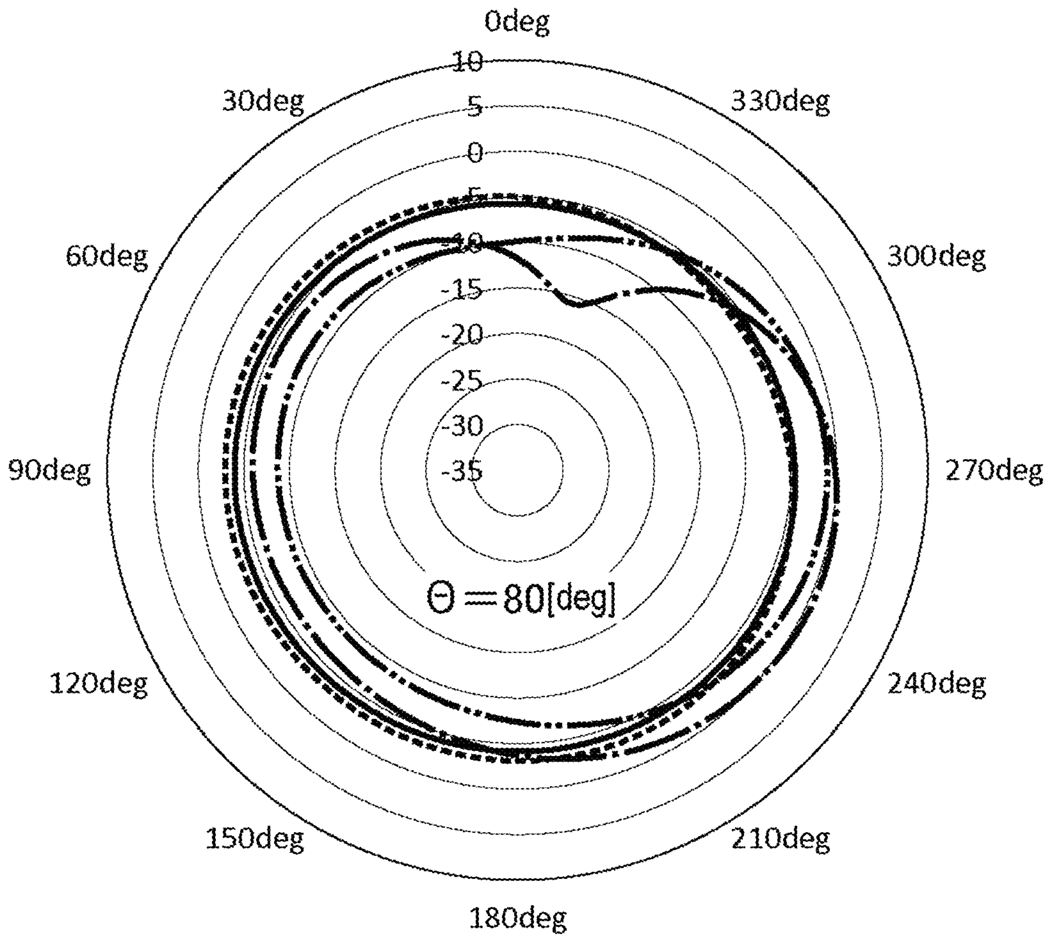
FIG. 13 is a diagram showing a simulation result regarding a directivity of a gain of a circularly polarized wave (right-handed polarized wave) around the angle φ at the angle θ=80 [deg] in a case where an operating frequency of the circularly polarized antenna AN shown in FIG. 4 is 1575 MHz.

FIG. 12 shows a simulation result regarding a directivity of a gain of a circularly polarized wave (right-handed polarized wave) around the angle φ at the angle θ=60 [deg] in a case where the operating frequency of the circularly polarized antenna AN shown in FIG. 4 is 1575 MHz. FIG. 13 shows a simulation result regarding a directivity of a gain of a circularly polarized wave (right-handed polarized wave) around the angle φ at the angle θ=80 [deg] in a case where the operating frequency of the circularly polarized antenna AN shown in FIG. 4 is 1575 MHz.

In each of FIGS. 12 and 13, a circumferential direction represents an angle φ [deg]. The distance from the center represents a gain [dBic].

In each of FIGS. 12 and 13, the solid line indicates a simulation result when the length L of the parasitic element EL is 0 [mm], that is, when the parasitic element EL is not provided. A dotted line indicates a simulation result when the length L of the parasitic element EL is 40 [mm]. A one-dot chain line indicates a simulation result when the length L of the parasitic element EL is 80 [mm]. A two-dot chain line indicates a simulation result when the length L of the parasitic element EL is 100 [mm].

As can be seen from FIGS. 12 and 13, as the length L of the parasitic element EL increases from 0 [mm], the directivity of the circularly polarized antenna AN is deformed and is most deformed when the length L is about 80 [mm]. Moreover, even when the length L of the parasitic element EL is 100 [mm], the directivity of the circularly polarized antenna AN is deformed. Therefore, it is suggested that the directivity of the circularly polarized antenna AN is biased to a specific angle due to the influence of the parasitic element EL.

Figure 14:
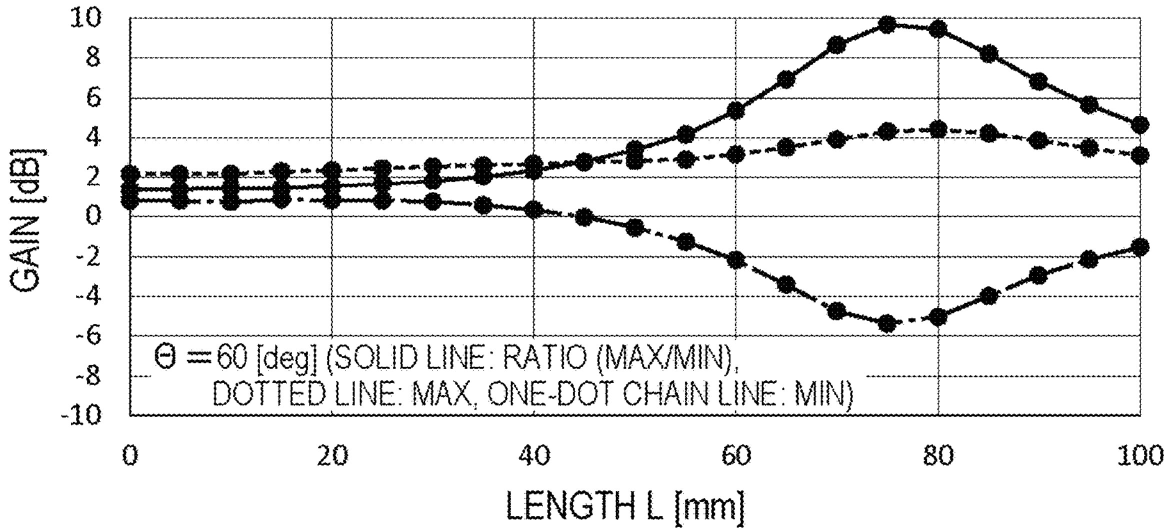
FIG. 14 is a diagram showing a simulation result regarding a relationship between a length L [mm] of the parasitic element EL in an ungrounded state and a directivity of a gain of a circularly polarized wave (right-handed polarized wave) around the angle φ at the angle θ=60 [deg] in a case where an operating frequency of the circularly polarized antenna AN shown in FIG. 4 is 1575 MHz.
Figure 15:
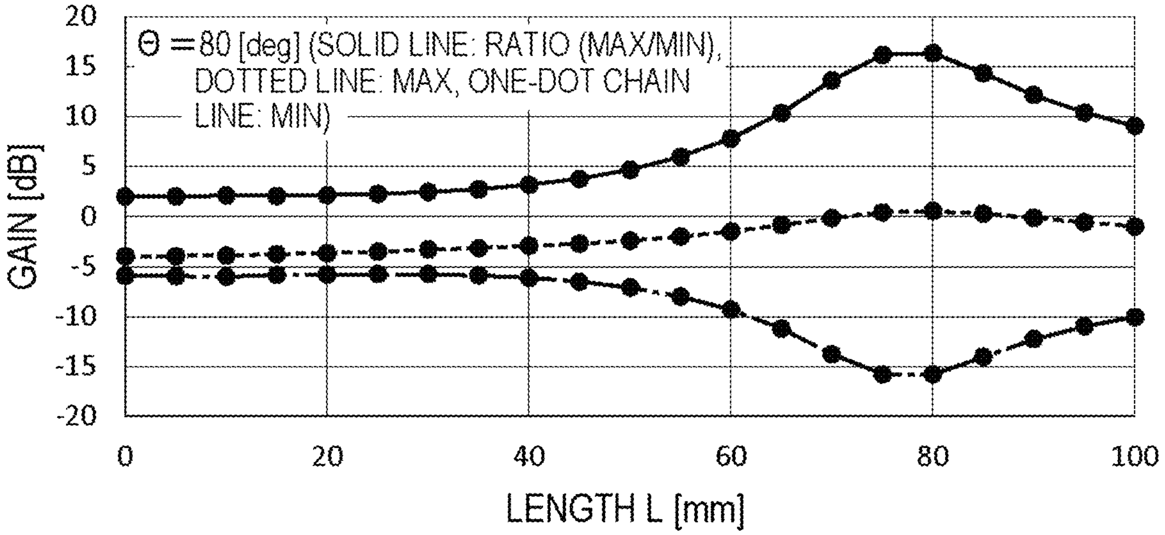
FIG. 15 is a diagram showing a simulation result regarding a relationship between a length L [mm] of the parasitic element EL in an ungrounded state and a directivity of a gain of a circularly polarized wave (right-handed polarized wave) around the angle φ at the angle θ=80 [deg] in a case where an operating frequency of the circularly polarized antenna AN shown in FIG. 4 is 1575 MHz.

FIG. 14 is a diagram showing a simulation result regarding a relationship between a length L [mm] of the parasitic element EL in an ungrounded state and a directivity of a gain of a circularly polarized wave (right-handed polarized wave) around the angle φ at the angle θ=60 [deg] in a case where an operating frequency of the circularly polarized antenna AN shown in FIG. 4 is 1575 MHz. FIG. 15 is a diagram showing a simulation result regarding a relationship between a length L [mm] of the parasitic element EL in an ungrounded state and a directivity of a gain of a circularly polarized wave (right-handed polarized wave) around the angle φ at the angle θ=[deg] in a case where an operating frequency of the circularly polarized antenna AN shown in FIG. 4 is 1575 MHz.

In each of FIGS. 14 and 15, a horizontal axis represents a length L [mm] of the parasitic element EL. A vertical axis represents a gain [dB].

Further, in each of FIGS. 14 and 15, a solid line represents a ratio (MAX/MIN) of a maximum value to a minimum value. A dotted line represents a maximum value (MAX) of the directivity of the gain. A one-dot chain line represents a minimum value (MIN) of the directivity of the gain.

As can be seen from FIGS. 14 and 15, as the length L [mm] of the parasitic element EL increases from 0 [mm], the ratio (MAX/MIN) of the maximum value to the minimum value increases and becomes the largest when the length L is about 80 [mm]. The ratio (MAX/MIN) of the maximum value to the minimum value gradually decreases when the length L exceeds about 80 [mm], but the ratio (MAX/MIN) when the length L is 100 [mm] is greater than the ratio (MAX/MIN) when the length L is 0 [mm].

This suggests that the parasitic element EL affects the directivity of the circularly polarized antenna AN when the length L [mm] is long. Therefore, when the parasitic element EL is not grounded, the length L of the parasitic element EL is preferably approximately ½ or less, and more preferably 3⁄10 or less of the wavelength of the operating frequency of the circularly polarized antenna AN.

As a result of such simulations, the inventors found that deterioration of the antenna characteristics of the first antenna element 108 can be suppressed by adjusting the total lengths of the parasitic elements 111, and 112*a* to 112*c*. Specifically, as described above, in a case of the ungrounded parasitic elements 111, and 112*a* to 112*c*, the deterioration of the antenna characteristics of the first antenna element 108 can be suppressed by adjusting the total length to ½ or less of the wavelength of the circularly polarized wave transmitted or received by the first antenna element 108. Further, by adjusting the total length to 3⁄10 or less of the wavelength of the circularly polarized wave, the deterioration of the antenna characteristics of the first antenna element 108 can be further suppressed.

Specifically, the first parasitic element 111 is an element that functions as a waveguide for the second antenna element 110 and is arranged on a side opposite to the first antenna element 108 with the second antenna element 110 interposed therebetween in the front-rear direction. That is, the first parasitic element 111 according to the present embodiment is provided forward of the second antenna element 110. In this arrangement, since the first parasitic element 111 having a height corresponding to a shape of the case 101 rising from a tip (a front end in the present embodiment) can be arranged in the case 101, a space in the case 101 can be effectively used and the size of the antenna device 100 can be reduced while controlling the directivity.

The first parasitic element 111 according to the present embodiment is provided substantially perpendicular to the second board 109 and has a straight shape extending in the up-down direction.

Further, the first parasitic element 111 may not be substantially perpendicular to the second board 109 and may extend upward while being inclined with respect to the second board 109. Further, the first parasitic element 111 may include a curved portion or a bent portion connected to a straight portion fixed to the second board 109 in the same manner as the second parasitic elements 112*a* to 112*c* so that the tip portion of the first parasitic element 111 may protrude in a direction different from a direction in which the straight portion extends.

The second parasitic elements 112*a* to 112*c* are elements that function as reflectors for the second antenna element 110 and are arranged between the first antenna element 108 and the second antenna element 110 in the front-rear direction. In this arrangement, since the second parasitic elements 112*a* to 112*c* each having a height corresponding to a shape of the case 101 rising from a tip (a front end in the present embodiment) can be arranged in the case 101, a space in the case 101 can be effectively used and the size of the antenna device 100 can be reduced while controlling the directivity.

In the present embodiment, the number of the second parasitic elements 112*a* to 112*c* functioning as reflectors for the second antenna element 110 is greater than that of the first parasitic element 111 functioning as the waveguide for the second antenna element 110 and is three.

That is, in the antenna device 100 according to the present embodiment, one parasitic element 111 functioning as a waveguide and three parasitic elements 112*a* to 112*c* functioning as reflectors are provided. Thus, desired antenna characteristics can be realized in the second antenna element 110 by making the second antenna element 110 have a desired directivity while reducing the size of the antenna device 100 and reducing the manufacturing costs of the antenna device 100.

Further, at least one of the parasitic element 111, and 112*a* to 112*c* needs to be provided. That is, either the first parasitic element 111 functioning as a waveguide or the second parasitic elements 112*a* to 112*c* functioning as reflectors may not be provided. The first parasitic element 111 may be plural and the number of the second parasitic elements 112*a* to 112*c* may be one, two, or four or more.

The second parasitic element 112*a* is a parasitic element provided directly behind the second antenna element 110. The second parasitic element 112*b* is a parasitic element provided on the right rear side of the second antenna element 110. The second parasitic element 112*c* is a parasitic element provided on the left rear side of the second antenna element 110.

The second parasitic element 112*b* and the second parasitic element 112*c* are provided on sides different from each other with respect to the second antenna element 110 when viewed from the front. In the present embodiment, the second parasitic element 112*b* and the second parasitic element 112*c* are provided at generally symmetrical positions with respect to an imaginary line passing through the center of the first antenna element 108 and the center of the second antenna element 110 when viewed from above.

The second parasitic element 112*a* according to the present embodiment includes a straight portion 112*a*_1 that is provided substantially perpendicular to the second board 109 and extends in the up-down direction, a bent portion 112*a*_2 that is curved or bent, and a tip portion 112*a*_3 that extends forward. Thus, the tip portion 112*a*_3 protrudes forward by being connected to an upper end of the straight portion 112*a*_1 through the bent portion 112*a*_2.

The second parasitic element 112*b* includes a straight portion 112*b*_1 that is provided substantially perpendicular to the second board 109 and extends in the up-down direction, a bent portion 112*b*_2 that is curved or bent, and a tip portion 112*b*_3 that extends rearward. Thus, the tip portion 112*b*_3 protrudes rearward by being connected to an upper end of the straight portion 112*b*_1 through the bent portion 112*b*_2.

Similarly to the second parasitic element 112*b*, the second parasitic element 112*c* includes a straight portion 112*c*_1 that is provided substantially perpendicular to the second board 109 and extends in the up-down direction, a bent portion 112*c*_2 that is curved or bent, and a tip portion 112*c*_3 that extends rearward. Thus, the tip portion 112*c*_3 protrudes rearward by being connected to an upper end of the straight portion 112*b*_1 through the bent portion 112*c*_2.

Here, in order for the first parasitic element 111 to function as a waveguide and each of the second parasitic elements 112*a* to 112*c* to function as a reflector, the total length of each of the second parasitic elements 112*a* to 112*c* is longer than the total length of the first parasitic element 111.

This is because whether the parasitic element mainly functions as a waveguide or a reflector for the antenna element changes in relation to the wavelength of the radio wave transmitted or received by the antenna element.

For example, the first parasitic element 111 functions as a waveguide by having a total length of approximately ½ or less of the wavelength (about 50 mm in the present embodiment) of the linearly polarized wave (here, vertically polarized wave) transmitted or received by the second antenna element 110. Each of the second parasitic elements 112*a* to 112*c* functions as a reflector by having a total length longer than approximately ½ of the wavelength of the vertically polarized wave.

In addition, the second parasitic elements 112*a* to 112*c*, which are long enough to function as reflectors, may not fit in the accommodation space if they are straight as a whole. In the present embodiment, the second parasitic elements 112*a* to 112*c* can be accommodated in the accommodation space while having a sufficient length to function as reflectors by providing the bent portions 112*a*_2, 112*b*_2, and 112*c*_2. Therefore, it is possible to reduce the size of the antenna device 100 while improving the antenna characteristics of the second antenna element 110.

Furthermore, projecting directions of the tip portions 112*a*_3, 112*b*_3, and 112*c*_3 are different between the second parasitic element 112*a* and the second parasitic elements 112*b* and 112*c*. That is, the tip portion 112*a*_3 of the second parasitic element 112*a* positioned on the front side protrudes rearward, and the tip portions 112*b*_3 and 112*c*_3 of the second parasitic elements 112*b* and 112*c* positioned on the rear side protrude forward.

Thus, three second parasitic elements 112*a* to 112*c* can be compactly arranged in the front-rear direction while having a sufficient length to function as reflectors. Therefore, it is possible to suppress an increase in size of the antenna device 100 while improving the antenna characteristics of the second antenna element 110.

Furthermore, each of the parasitic elements 111, and 112*a* to 112*c* can also serve as a wave source. Therefore, even with the above-described length functioning as a waveguide or reflector, when a distance from the second antenna element 110 becomes distant, the function as the waveguide or reflector may not be sufficiently exhibited due to the influence of a phase difference at that distance.

For example, the first parasitic element 111 having the above-described length functioning as a waveguide functions as a reflector when the distance from the second antenna element 110 becomes distant. Further, for example, each of the second parasitic elements 112*a* to 112*c* having the above-described lengths functioning as reflectors causes a deviation in gain in a horizontal plane due to a wave source by each of them when the distance from the second antenna element 110 becomes distant.

Therefore, it is preferable that each of the parasitic elements 111, and 112*a* to 112*c* is arranged within a range of ½ of the wavelength of the vertically polarized wave received by the second antenna element 110 from an installation position of the second antenna element 110.

Thus, deterioration of the antenna characteristics of the second antenna element 110 due to the parasitic elements 111, and 112*a* to 112*c* serving as wave sources is suppressed, so that the first parasitic element 111 can function as a waveguide, and each of the second parasitic elements 112*a* to 112*c* can function as a reflector having good characteristics. Therefore, it is possible to improve the antenna characteristics of the second antenna element 110 by providing a desired directivity.

Similarly, each of the parasitic elements 111, and 112*a* to 112*c* deteriorates the antenna characteristics (axial ratio and the like) of the first antenna element 108 by serving a wave source. For example, in a case where the total length of each of the ungrounded parasitic elements 111, and 112*a* to 112*c* is more than ½ of the wavelength of the circularly polarized wave transmitted or received by the first antenna element 108, each of the parasitic elements 111, and 112*a* to 112*c* is desirably arranged at a distance of about 50 to 60 mm or more from the center of the first antenna element 108, for example, in a case of a 1555 to 1610 MHz circularly polarized antenna.

Thus, the influence of the parasitic elements 111, and 112*a* to 112*c* as wave sources on the first antenna element 108 can be suppressed, and deterioration of the axial ratio of the first antenna element 108 can be suppressed. Therefore, it is possible to suppress deterioration of the antenna characteristics of the first antenna element 108.

The resin holder 113 is a solid material made of resin provided with through-holes or grooves for holding the second antenna element 110, the first parasitic element 111, and the second parasitic elements 112*a* to 112*c*.

The resin holder 113 according to the present embodiment includes a front holder portion 113*a* and a rear holder portion 113*b*. The resin holder 113 may be integrally formed as a whole or may be configured by combining a plurality of separable parts such as the front holder portion 113*a* and the rear holder portion 113*b*, for example.

The front holder portion 113*a* is generally a rectangular parallelepiped having the same height as the first parasitic element 111 and is longer in the front-rear direction than in the left-right direction.

The front holder portion 113*a* is provided with through-holes that penetrate in the up-down direction and are arranged side by side in the front and rear. The first parasitic element 111 is inserted into the front through-hole, and the second antenna element 110 is inserted into the rear through-hole.

The rear holder portion 113*b* has generally the same height as the straight portions 112*a*_1, 112*b*_1, and 112*c*_1 as a whole and includes a first holding portion 113*b*_1 composed of a flat plate portion and a portion protruding rearward from an upper end portion of the flat plate portion and a second holding portion 113*b*_2 projecting rearward from the center of a rear surface of the flat plate portion.

The first holding portion 113*b*_1 includes grooves extending in the up-down direction on a front surface thereof and extending from the front to the rear on an upper surface thereof at left and right symmetrical positions, and the second parasitic element 112*b* and the second parasitic element 112*c* are fitted into the right and left grooves, respectively.

The second holding portion 113*b*_2 includes a groove extending in the up-down direction at the center of a rear surface thereof and extending from the rear to the front on an upper surface thereof, and the second parasitic element 112*a* is fitted into the groove.

The resin holder 113 according to the present embodiment is fixed to the second board 109 by screwing portions extending to the left and right from a bottom portion of the rear holder portion 113*b*. Further, the first parasitic element 111 and the second parasitic elements 112*a* to 112*c* may be locked to the resin holder 113 by being fitted into the grooves or may be fixed with an adhesive or the like as appropriate.

Dielectrics generally have the effect of shortening wavelengths of high-frequency electromagnetic waves (dielectric shortening). Therefore, by holding the parasitic elements 111, and 112*a* to 112*c* by the resin holder 113, dimensions of the parasitic elements 111, and 112*a* to 112*c* can be reduced. Therefore, it is possible to reduce the size of the antenna device 100.

In particular, the shorter the wavelength, the greater the effect of dielectric shortening, even in a case where a volume occupied by the dielectric is small. Therefore, the effect is particularly large in the second antenna element 110 that is used for transmitting and receiving radio waves with relatively short wavelengths such as radio waves for V2X.

The shape of the resin holder 113 may be changed as appropriate, and the resin holder 113 may be partially or wholly hollow. Furthermore, the resin holder 113 may not be provided on the second antenna unit 104.

The third antenna unit 105 includes a third board 114, a capacitance loading element 115*a*, and a helical element 115*b*.

The third board 114 is a board fixed to the antenna base 100 and is, for example, a PCB. The capacitance loading element 115*a* and the helical element 115*b* are, for example, antenna elements for receiving radio waves for DAB (Digital Audio Broadcast). The capacitance loading element 115*a* is fixed to a holder that holds the helical element 115*b*, and the holder is fixed to the third board 114.

The radio waves received or transmitted by the third antenna unit 105 are not limited to the radio waves for DAB and may be changed as appropriate. For example, radio waves for AM/FM may be used. Further, a configuration of the antenna element of the third antenna unit 105 may be appropriately changed according to the radio waves received by the third antenna unit 105.

An upper end (upper surface) of the first antenna unit 103 is arranged at a position lower than an upper end of the second antenna element 110 in the present embodiment, but may be arranged at a position higher than the upper end of the second antenna element 110.

When the upper end (upper surface) of the first antenna unit 103 is arranged at a position lower than the upper end of the second antenna element 110, the electrical characteristics of the second antenna element 110 can be improved. In addition, when the upper end (upper surface) of the first antenna unit 103 is arranged at a position higher than the upper end of the second antenna element 110, the electrical characteristics of the first antenna unit 103 can be improved. By setting a height relationship between the first antenna unit 103 and the second antenna element 110 according to the application of design, antenna characteristics of each of the first antenna unit 103 and the second antenna element 110 can be ensured without impairing designability of the antenna device 100, so that it is possible to reduce the size of the antenna device 100.

An upper end of the third antenna unit 105 is arranged at a position higher than the upper end of the second antenna element 110 in the present embodiment, but may be arranged at a position lower than the upper end of the second antenna element 110.

When the upper end of the third antenna unit 105 is arranged at a position higher than the upper end of the second antenna element 110, the electrical characteristics of the third antenna unit 105 can be improved. Further, when the upper end of the third antenna unit 105 is arranged at a position lower than the upper end of the second antenna element 110, the electrical characteristics of the second antenna element 110 can be improved. By setting a height relationship between the third antenna unit 105 and the second antenna element 110 according to the application of design, antenna characteristics of each of the third antenna unit 105 and the second antenna element 110 can be ensured without impairing designability of the antenna device 100, so that it is possible to reduce the size of the antenna device 100.

Modification Example 1

Although an example in which the parasitic elements 111, and 112*a* to 112*c* are ungrounded has been described in the embodiment, the parasitic elements for giving a directivity to the second antenna element 110 may be grounded.

The second antenna unit 204 according to Modification Example 1 includes the second board 109, the second antenna element 110, and the resin holder 113 like the embodiment, and includes a first parasitic element 211 and second parasitic elements 212*a* to 212*c* in place of the first parasitic element 111 and the second parasitic elements 112*a* to 112*c* according to the embodiment. Except for these, the second antenna unit 204 according to this modification example may be configured in the same manner as the second antenna unit 104 according to the embodiment.

Figure 16:
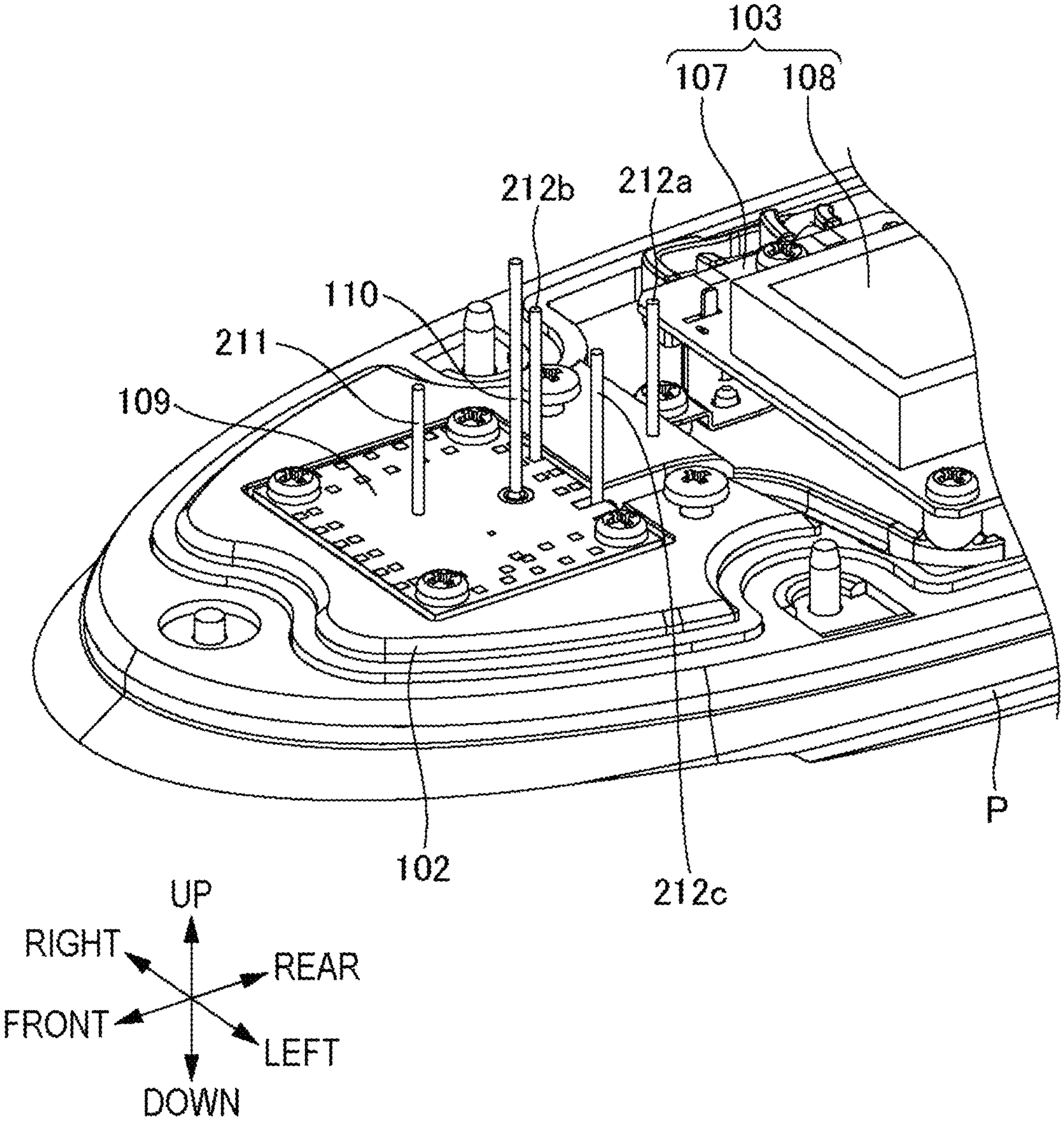
FIG. 16 is an enlarged perspective view of the second antenna unit in a state in which a resin holder is removed, according to Modification Example 1.

FIG. 16 is an enlarged perspective view of the second antenna unit 204 according to Modification Example 1, showing a state in which the resin holder 113 is removed, as in FIG. 3.

Each of the first parasitic element 211 and the second parasitic elements 212*a* to 212*c* is grounded and has a total length which is ¼ or less of the wavelength of the circularly polarized wave transmitted or received by the first antenna element 108, preferably 3/20 or less of the wavelength of the circularly polarized wave.

Here, like each of the ungrounded parasitic elements 111, and 112*a* to 112*c* described in the embodiment, each of the grounded parasitic elements 211, and 212*a* to 212*c* deteriorates the antenna characteristics (axial ratio and the like) of the first antenna element 108 by serving a wave source. The influence of the grounded parasitic elements 211, and 212*a* to 212*c* on the first antenna element 108, which is such a circularly polarized antenna, was simulated.

The model adopted for the simulation according to this modification example is a model in which the parasitic element EL is changed to a grounded state in the model described with reference to FIGS. 4 to 6.

That is, also in the simulation in this modification example, the circular ground plate PL is a circular installed plate with a diameter of 1 [m]. The circularly polarized antenna AN is an antenna provided at the center of the circular ground plate PL, and an operating frequency thereof is 1555 to 1610 MHz. The circularly polarized antenna AN receives right-handed polarized waves. The parasitic element EL is installed in the vicinity of the circularly polarized antenna AN, and a distance between the parasitic element EL and the circularly polarized antenna AN is 20 [mm]. The parasitic element EL is a straight rod-shaped element having a length L [mm] in the Z-axis direction. However, in the simulation according to this modification example, the parasitic element EL is grounded by being electrically connected to the circular ground plate PL.

Figure 17:
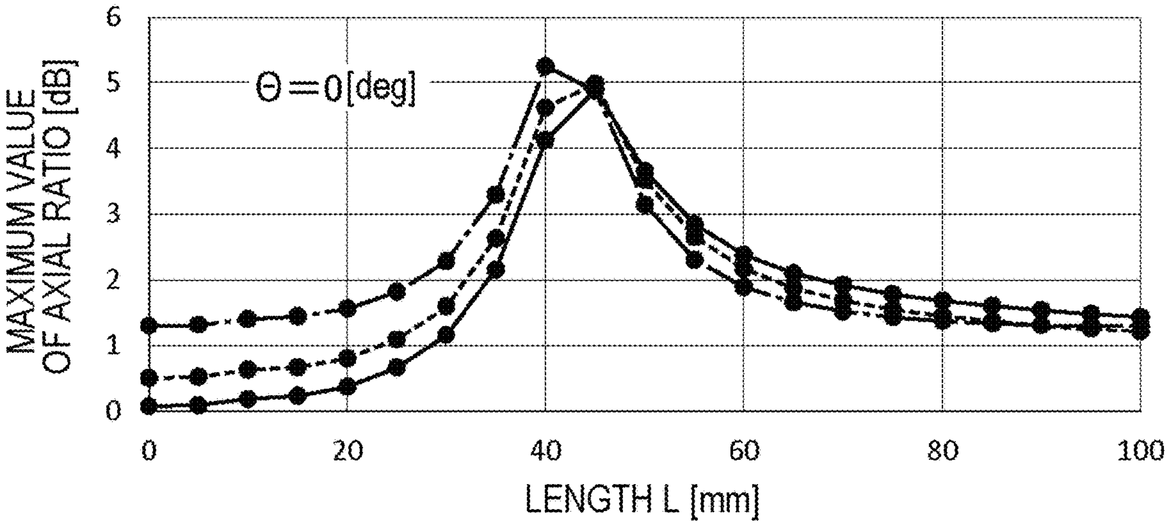
FIG. 17 is a diagram showing a simulation result for the circularly polarized antenna shown in FIG. 4 regarding a relationship between a length L [mm] of the parasitic element EL in a grounded state and a maximum value of an axial ratio in an angular distribution of the axial ratio around the angle φ at the angle θ=0 [deg].
Figure 18:
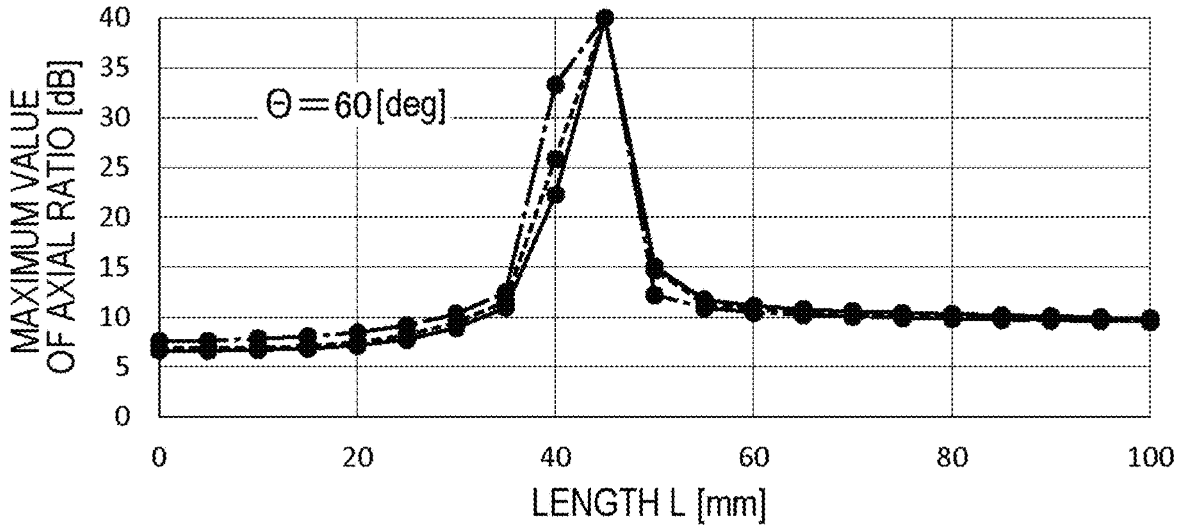
FIG. 18 is a diagram showing a simulation result for the circularly polarized antenna shown in FIG. 4 regarding a relationship between a length L [mm] of the parasitic element EL in a grounded state and a maximum value of an axial ratio in an angular distribution of the axial ratio around the angle φ at the angle θ=60 [deg].
Figure 19:
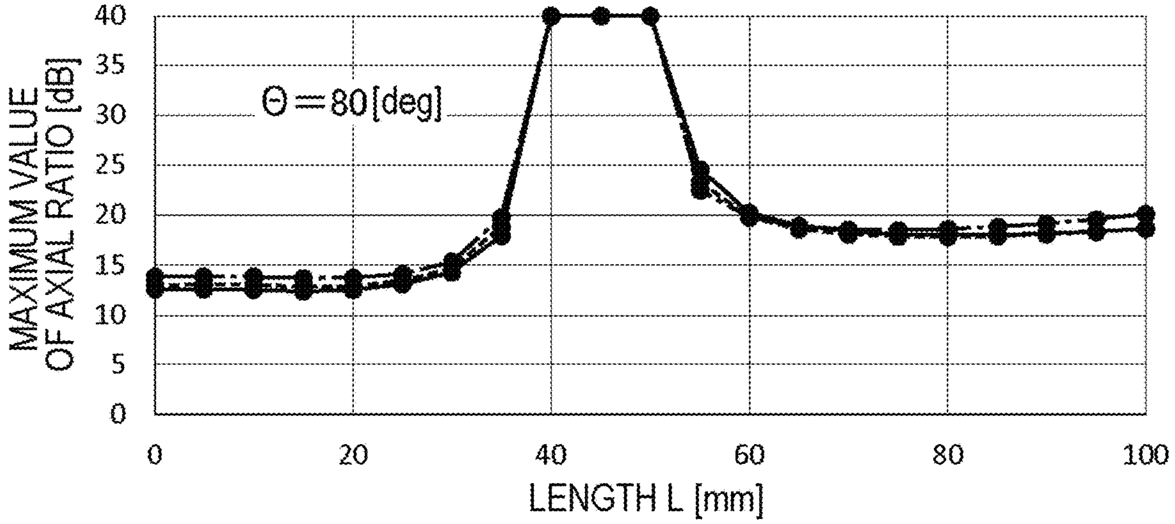
FIG. 19 is a diagram showing a simulation result for the circularly polarized antenna shown in FIG. 4 regarding a relationship between a length L [mm] of the parasitic element EL in a grounded state and a maximum value of an axial ratio in an angular distribution of the axial ratio around the angle φ at the angle θ=80 [deg].

FIG. 17 is a diagram showing a simulation result for the circularly polarized antenna shown in FIG. 4 regarding a relationship between a length L [mm] of the parasitic element EL in a grounded state and a maximum value of an axial ratio in an angular distribution of the axial ratio around the angle φ at the angle θ=0 [deg]. FIG. 18 is a diagram showing a simulation result for the circularly polarized antenna regarding a relationship between a length L [mm] of the parasitic element EL in a grounded state and a maximum value of an axial ratio in an angular distribution of the axial ratio around the angle φ at the angle θ=60 [deg]. FIG. 19 is a diagram showing a simulation result regarding a relationship between a length L [mm] of the parasitic element EL and a maximum value of an axial ratio in an angular distribution of the axial ratio around the angle φ at the angle θ=80 [deg].

In each of FIGS. 17 to 19, a horizontal axis represents a length L [mm] of the parasitic element EL. A vertical axis represents the maximum value [dB] of the axial ratio.

Further, in each of FIGS. 17 to 19, a solid line indicates a simulation result when the operating frequency is 1560 MHz. A dotted line indicates a simulation result when the operating frequency is 1575 MHz. A one-dot chain line indicates a simulation result when the operating frequency is 1600 MHz.

As can be seen from FIGS. 17 to 19, as the length L of the parasitic element EL increases from 0 [mm], the maximum value of the axial ratio increases and becomes the largest when the length L is about 40 [mm]. That is, as the length L of the parasitic element EL increases from 0 [mm], the axial ratio deteriorates and becomes worst when the length L is about 40 [mm].

Here, the length L of the parasitic element EL of 40 [mm] corresponds to approximately ¼ of wavelengths of the operating frequencies of 1560 MHz, 1575 MHz, and 1600 MHz of the circularly polarized antenna. Therefore, when the parasitic element EL is grounded, the length L of the parasitic element EL is preferably approximately ¼ or less, and more preferably 3/20 or less of the wavelength of the operating frequency of the circularly polarized antenna AN.

Figure 20:
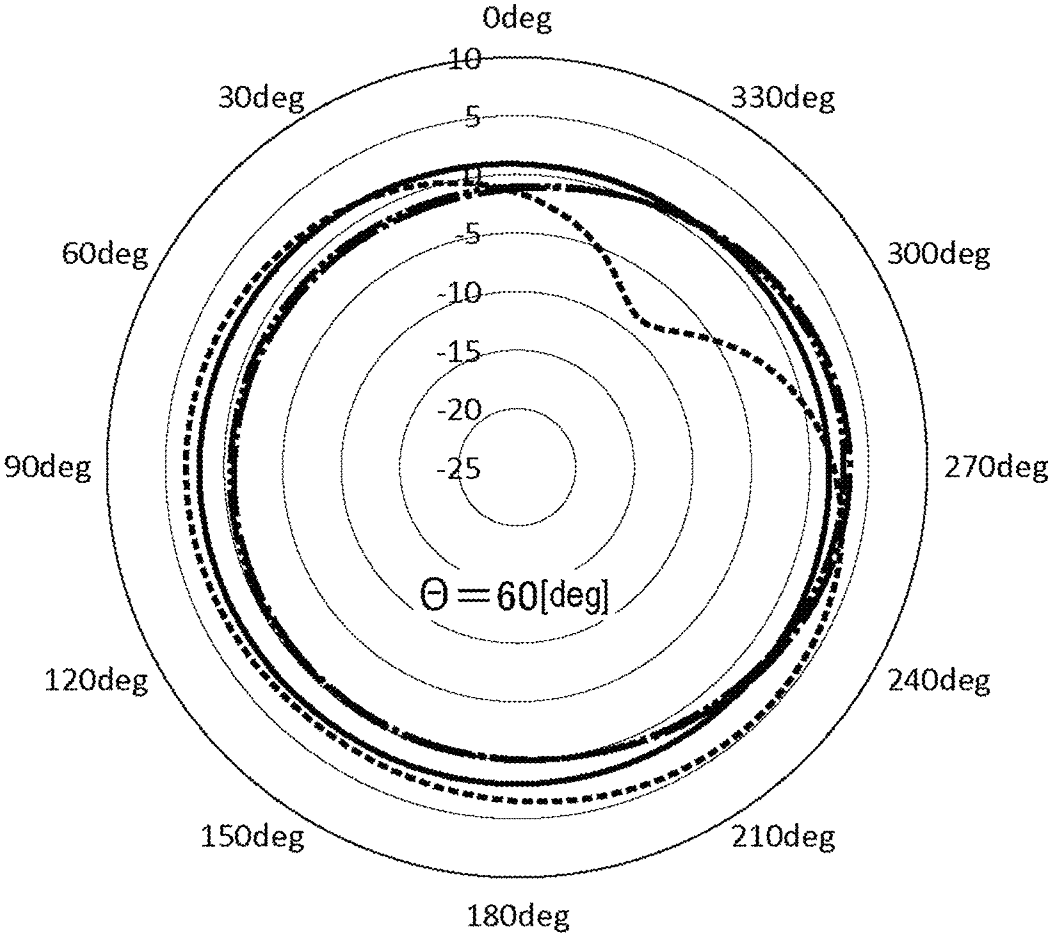
FIG. 20 shows a simulation result regarding a directivity of a gain of a circularly polarized wave (right-handed polarized wave) around the angle φ at the angle θ=60 [deg] in a case where an operating frequency of the circularly polarized antenna AN shown in FIG. 4 is 1575 MHz.
Figure 21:
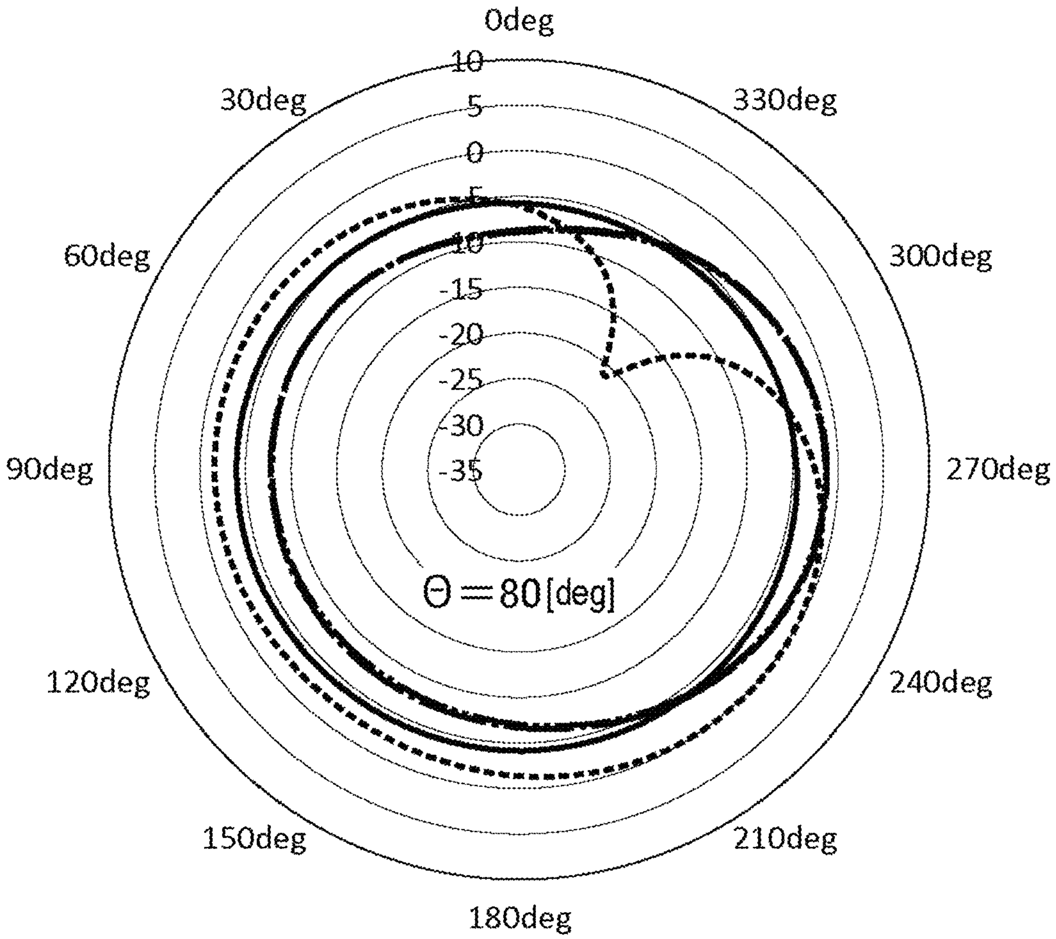
FIG. 21 shows a simulation result regarding a directivity of a gain of a circularly polarized wave (right-handed polarized wave) around the angle φ at the angle θ=80 [deg] in a case where an operating frequency of the circularly polarized antenna AN shown in FIG. 4 is 1575 MHz.

FIG. 20 shows a simulation result regarding a directivity of a gain of a circularly polarized wave (right-handed polarized wave) around the angle φ at the angle θ=60 [deg] in a case where the operating frequency of the circularly polarized antenna AN shown in FIG. 4 is 1575 MHz. FIG. 21 shows a simulation result regarding a directivity of a gain of a circularly polarized wave (right-handed polarized wave) around the angle φ at the angle θ=80 [deg] in a case where the operating frequency of the circularly polarized antenna AN shown in FIG. 4 is 1575 MHz.

In each of FIGS. 20 and 21, a circumferential direction represents an angle φ [deg]. The distance from the center represents a gain [dBic].

In each of FIGS. 20 to 21, the solid line indicates the simulation results when the length L of the parasitic element EL is 0 [mm], that is, when the parasitic element EL is not provided. A dotted line indicates a simulation result when the length L of the parasitic element EL is 40 [mm]. A one-dot chain line indicates a simulation result when the length L of the parasitic element EL is 80 [mm]. A two-dot chain line indicates a simulation result when the length L of the parasitic element EL is 100 [mm].

As can be seen from FIGS. 20 and 21, as the length L of the parasitic element EL increases from 0 [mm], the directivity of the circularly polarized antenna AN is deformed and is most deformed when the length L is about 40 [mm]. Moreover, even when the length L of the parasitic element EL is 100 [mm], the directivity of the circularly polarized antenna AN is deformed. Therefore, it is suggested that the directivity of the circularly polarized antenna AN is biased to a specific angle due to the influence of the parasitic element EL.

Figure 22:
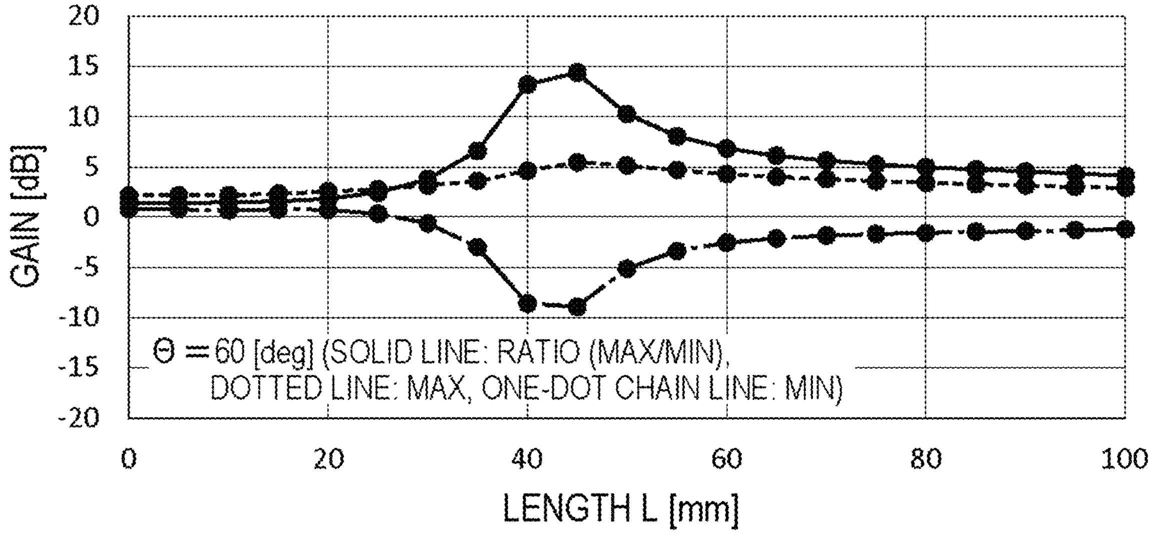
FIG. 22 is a diagram showing a simulation result regarding a relationship between a length L [mm] of the parasitic element EL in a grounded state and a directivity of a gain of a circularly polarized wave (right-handed polarized wave) around the angle φ at the angle θ=60 [deg] in a case where an operating frequency of the circularly polarized antenna AN shown in FIG. 4 is 1575 MHz.
Figure 23:
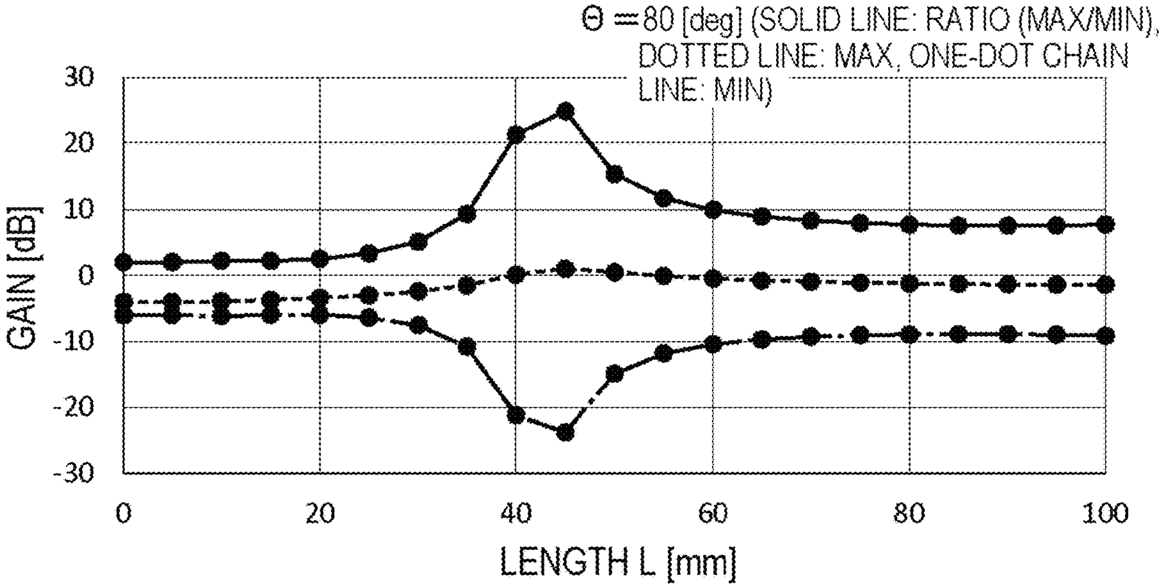
FIG. 23 is a diagram showing a simulation result regarding a relationship between a length L [mm] of the parasitic element EL in a grounded state and a directivity of a gain of a circularly polarized wave (right-handed polarized wave) around the angle φ at the angle θ=80 [deg] in a case where an operating frequency of the circularly polarized antenna AN shown in FIG. 4 is 1575 MHz.

FIG. 22 is a diagram showing a simulation result regarding a relationship between a length L [mm] of the parasitic element EL in a grounded state and a directivity of a gain of a circularly polarized wave (right-handed polarized wave) around the angle φ at the angle θ=60 [deg] in a case where an operating frequency of the circularly polarized antenna AN shown in FIG. 4 is 1575 MHz. FIG. 23 is a diagram showing a simulation result regarding a relationship between a length L [mm] of the parasitic element EL in a grounded state and a directivity of a gain of a circularly polarized wave (right-handed polarized wave) around the angle φ at the angle θ=80 [deg] in a case where an operating frequency of the circularly polarized antenna AN shown in FIG. 4 is 1575 MHz.

In each of FIGS. 22 and 23, a horizontal axis represents a length L [mm] of the parasitic element EL. A vertical axis represents a gain [dB].

Further, in each of FIGS. 22 and 23, a solid line represents a ratio (MAX/MIN) of a maximum value to a minimum value of the gain. A dotted line represents a maximum value (MAX) of the directivity of the gain. A one-dot chain line represents a minimum value (MIN) of the directivity of the gain.

As can be seen from FIGS. 22 and 23, as the length L [mm] of the parasitic element EL increases from 0 [mm], the ratio (MAX/MIN) of the maximum value to the minimum value increases and becomes the largest when the length L is about 40 [mm]. The ratio (MAX/MIN) of the maximum value to the minimum value gradually decreases when the length L exceeds about 40 [mm], but the ratio (MAX/MIN) when the length L is 100 [mm] is greater than the ratio (MAX/MIN) when the length L is 0 [mm].

This suggests that the parasitic element EL affects the directivity of the circularly polarized antenna AN when the length L [mm] is long. Therefore, when the parasitic element EL is grounded, the length L of the parasitic element EL is preferably approximately ¼ or less, and more preferably 3/20 or less of the wavelength of the operating frequency of the circularly polarized antenna AN.

As a result of such simulations, the inventors found that deterioration of the antenna characteristics of the first antenna element 108 can be suppressed by adjusting the total length of each of the grounded parasitic elements 211, and 212*a* to 212*c*. Specifically, as described above, in a case of the grounded parasitic elements 211, and 212*a* to 212*c*, the deterioration of the antenna characteristics of the first antenna element 108 can be suppressed by adjusting the total length to ¼ or less of the wavelength of the circularly polarized wave transmitted or received by the first antenna element 108. By adjusting the total length to 3/20 or less of the wavelength of the circularly polarized wave, the deterioration of the antenna characteristics of the first antenna element 108 can be further suppressed.

Further, the grounded first parasitic element 211 functions as a waveguide by having a total length of approximately ¼ or less of the wavelength of the vertically polarized wave transmitted or received by the second antenna element 110. Each of the grounded second parasitic elements 212*a* to 212*c* functions as a reflector by having a total length longer than approximately ¼ of the wavelength of the vertically polarized wave.

Here, the grounded first parasitic element 211 and second parasitic elements 211*a* to 211*c* have a shorter length than the non-grounded first parasitic element 111 and the second parasitic elements 112*a* to 112*c* according to the embodiment and function as waveguides or reflectors.

It is considered that since the grounded parasitic element operates as if another virtual parasitic element is arranged on an opposite across the ground, the grounded parasitic element functions equivalently to a parasitic element having a length approximately twice an actual length of the parasitic element.

Therefore, by adopting the installed grounded parasitic elements 211, and 212*a* to 212*c*, their lengths can be shortened compared to the ungrounded case. Therefore, it is possible to reduce the size of the antenna device 100.

Further, as shown in FIG. 16, even though the second parasitic elements 211*a* to 211*c* provided behind the first parasitic element 211 are straight, the second parasitic elements 211*a* to 211*c* can be accommodated in the accommodation space. Therefore, the second parasitic elements 211*a* to 211*c* do not need to be bent and thus can be manufactured easily. Therefore, it is possible to reduce the labor for manufacturing the antenna device 100 and reduce the manufacturing costs.

Modification Example 2

In Modification Example 1, an example in which each of the parasitic elements 211, 211*a* to 211*c* is provided substantially perpendicular to the second board 109 has been described, but the grounded parasitic elements 211, 211*a* to 211*c* may be provided inclined with respect to the second board 109. Further, the grounded parasitic elements 211, 211*a* to 211*c* may include curved or bent portions.

Modification Example 3

In the embodiment, an example in which the parasitic elements 111, and 112*a* to 112*c* are composed of linear conductors has been described, but the parasitic elements for giving a directivity to the second antenna element 110 may be composed of a conductor embedded in a resin or may be a conductor pattern provided on a board.

Figure 24:
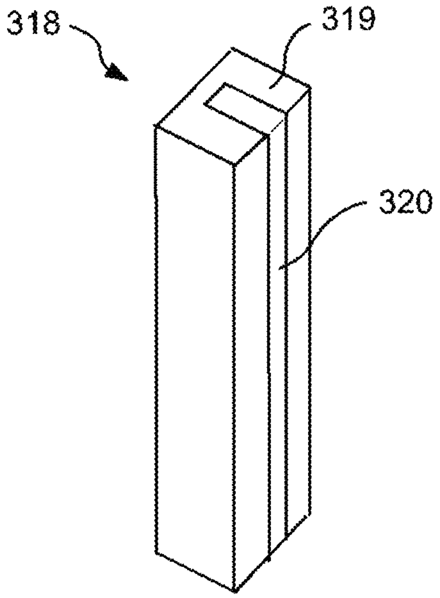
FIG. 24 is a perspective view showing an example of a parasitic element according to Modification Example 3.

FIG. 24 shows an example of a parasitic element 318 according to Modification Example 3. As shown in the figure, the parasitic element 318 is a columnar member composed of a conductor 320 embedded in a resin portion 319. The conductor 320 may be a straight rod, column, or the like and may include a curved or bent portion. Further, the parasitic element may be configured by a conductor pattern provided on a board by printing or the like.

The parasitic element 318 may be employed in the antenna device 100 in place of, for example, a part or all of the parasitic elements 111, and 112*a* to 112*c* according to the embodiment. Thus, since the effect of dielectric shortening described above is obtained, even though the parasitic element 318 is smaller than the parasitic elements 111, and 112*a* to 112*c* to be replaced, the second antenna element 110 can have the same directivity. Therefore, it is possible to reduce the size of the antenna device 100.

Modification Example 4

In the embodiment, an example in which the first parasitic element 111 is straight and the second parasitic elements 112*a* to 112*c* are linear including one curved or bent portion has been described. However, shapes of the parasitic elements 111, and 112*a* to 112*c* may be changed as appropriate.

For example, a part or all of the parasitic elements 111, and 112*a* to 112*c* may be conductors formed in a zigzag or helical shape. Further, for example, a part or all of the parasitic elements 111, and 112*a* to 112*c* may be plate-shaped conductors including a flat or curved portion. This also has the same effect as the embodiment.

In addition, a filter that cuts a frequency band used for circular polarization by the first antenna unit 103 and passes a frequency band used for linear polarization by the second antenna element 110 may be provided at any place of the parasitic elements 111, and 112*a* to 112*c*.

Figure 25:
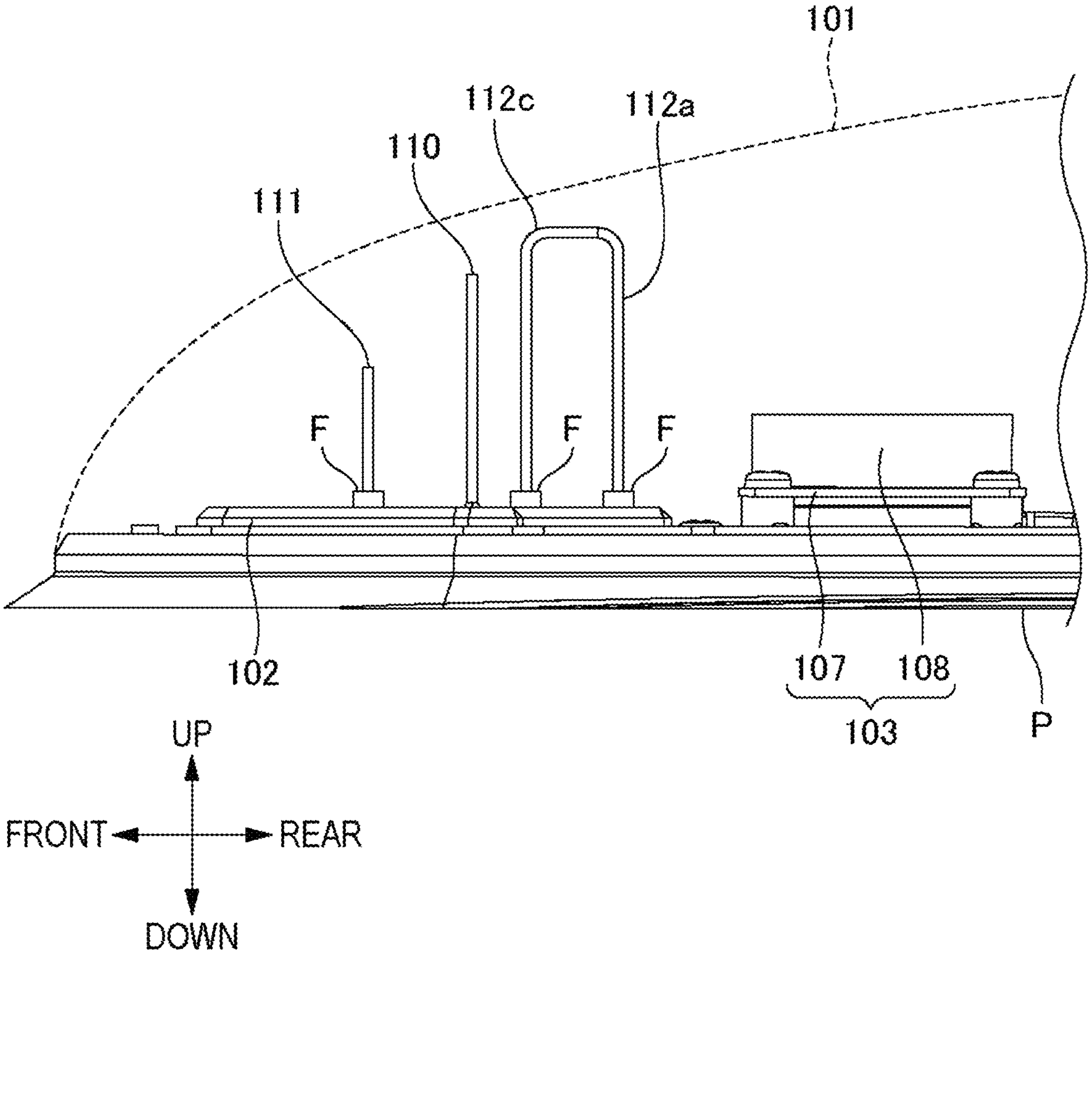
FIG. 25 is a side view showing an example of a configuration in which a parasitic element is connected to a board through a filter in Modification Example 4.

For example, as shown in FIG. 25, the parasitic elements 111, and 112*a* to 112*c* may be connected to the board through a filter F at their lower ends. FIG. 25 is a diagram showing a modification example in which the filter F is provided in the parasitic element, and the parasitic element 112*b* is positioned to the right of the parasitic element 112*c* and therefore is not shown in the figure.

By providing the filter in this way, each of the parasitic elements 111, and 112*a* to 112*c* operates as ungrounded in a frequency band used by the first antenna unit 103 and grounded in a frequency band used by the second antenna element 110. Therefore, mutual interference between antennas of the first antenna unit 103 and the second antenna element 110 can be reduced.

Examples 1 and 2 and Comparative Example

The effects of the antenna devices according to the embodiment and Modification Example 1 were verified using simulation models of Examples 1 and 2 and a comparative example. In Examples 1 and 2 and the comparative example, the front-rear direction, the left-right direction, and the up-down direction, which are the same as those of the embodiment and Modification Example 1, are used to indicate directions. Further, an angle with respect to the upper side is denoted by θ[deg], and an angle with respect to the front side is denoted by φ [deg].

Example 1 is a simulation model in which the first antenna unit 103 and the second antenna unit 104 according to the embodiment are arranged on a ground plate having a ground potential. Example 2 is a simulation model in which the first antenna unit 103 and the second antenna unit 204 according to Modification Example 1 are arranged on a ground plate having a ground potential.

The comparative example is a simulation model in which the first antenna unit 103 and the grounded second antenna unit 104 according to the embodiment are arranged on a ground plate having a ground potential. That is, the comparative example is a simulation model in which parasitic elements each having the same length and shape as those of the first parasitic element 111 and the second parasitic elements 112*a* to 112*c* according to the embodiment have the ground potential.

Figure 26:
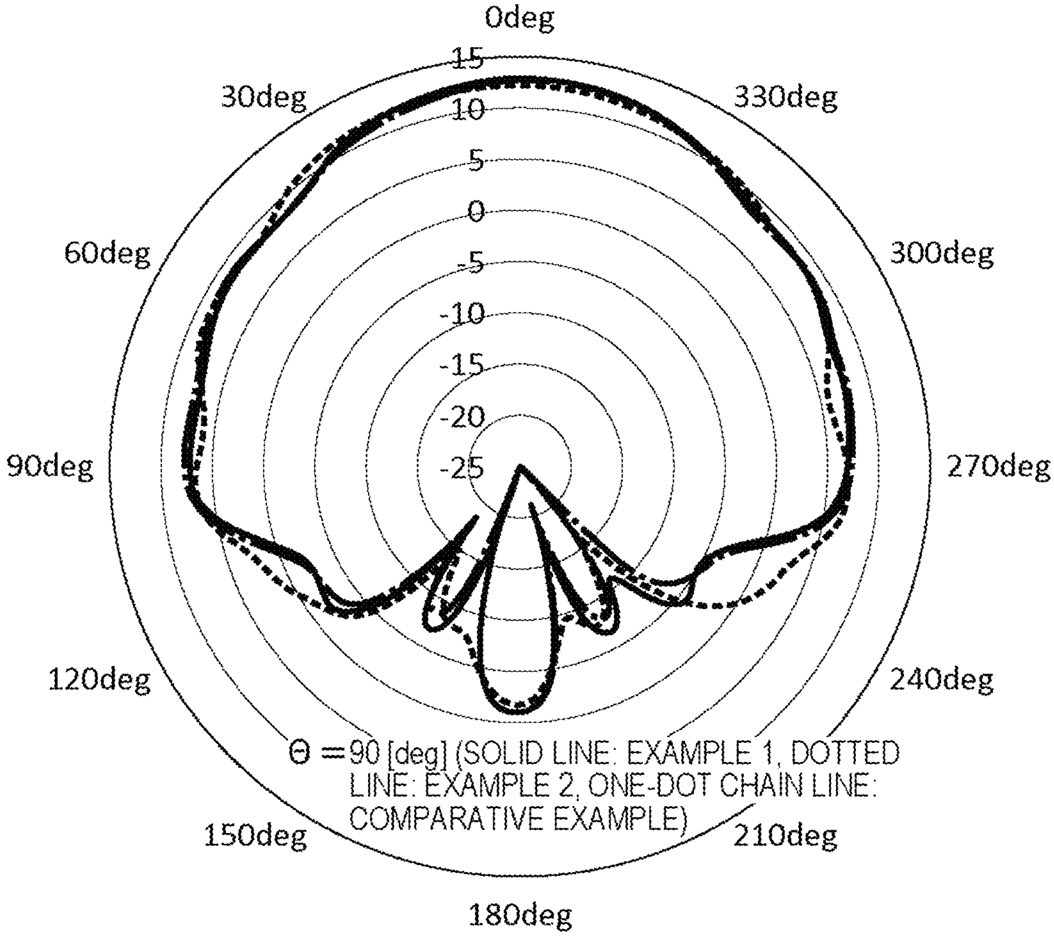
FIG. 26 is a diagram showing electrical characteristics of the second antenna unit 104 in a case where each model of Examples 1 and 2 and a comparative example is arranged on an infinite ground plate and showing a simulation result regarding a directivity of a gain of a vertically polarized wave around the angle φ at the angle θ=[deg] when an operating frequency is 5.9 GHz.

FIG. 26 is a diagram showing electrical characteristics of the second antenna unit 104 in a case where each model of Examples 1 and 2 and the comparative example is arranged on an infinite ground plate. The diagram shows a simulation result regarding a directivity of a gain of a vertically polarized wave around the angle φ at the angle θ=90 [deg] when an operating frequency is 5.9 GHz. In FIG. 26, a circumferential direction represents the angle φ. Further, a distance from the center represents the gain [dBi].

As can be seen from FIG. 26, in any of Examples 1 and 2 and the comparative example, the second antenna element 110 can be provided with approximately the same good forward directivity by the parasitic elements.

Figure 27:
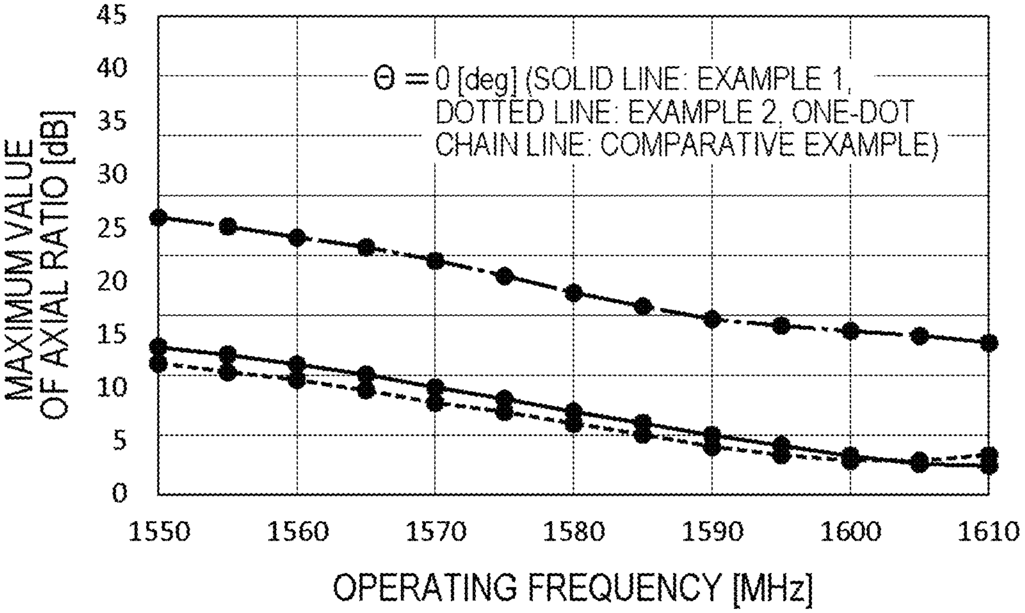
FIG. 27 is a diagram showing electrical characteristics of a first antenna unit 103 in a case where each model of Examples 1 and 2 and a comparative example is arranged on a circular ground plate and showing a simulation result regarding a relationship between an operating frequency [MHz] and a maximum value of an axial ratio in an angular distribution of the axial ratio around the angle φ at the angle θ=0 [deg].
Figure 28:
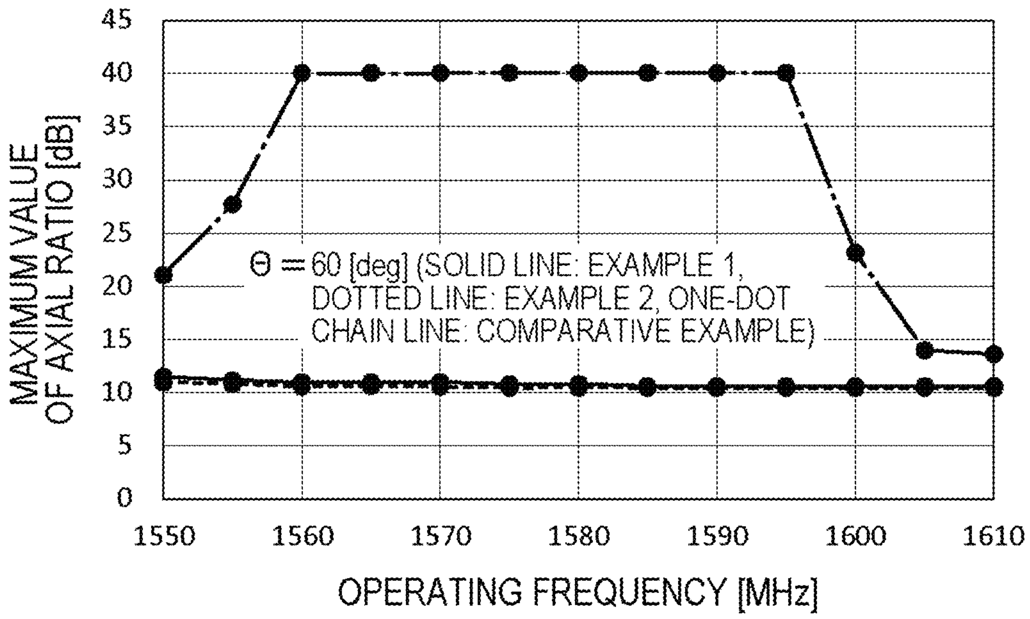
FIG. 28 is a diagram showing electrical characteristics of the first antenna unit 103 in a case where each model of Examples 1 and 2 and a comparative example is arranged on a circular ground plate and showing a simulation result regarding a relationship between an operating frequency [MHz] and a maximum value of an axial ratio in an angular distribution of the axial ratio around the angle φ at the angle θ=60 [deg].
Figure 29:
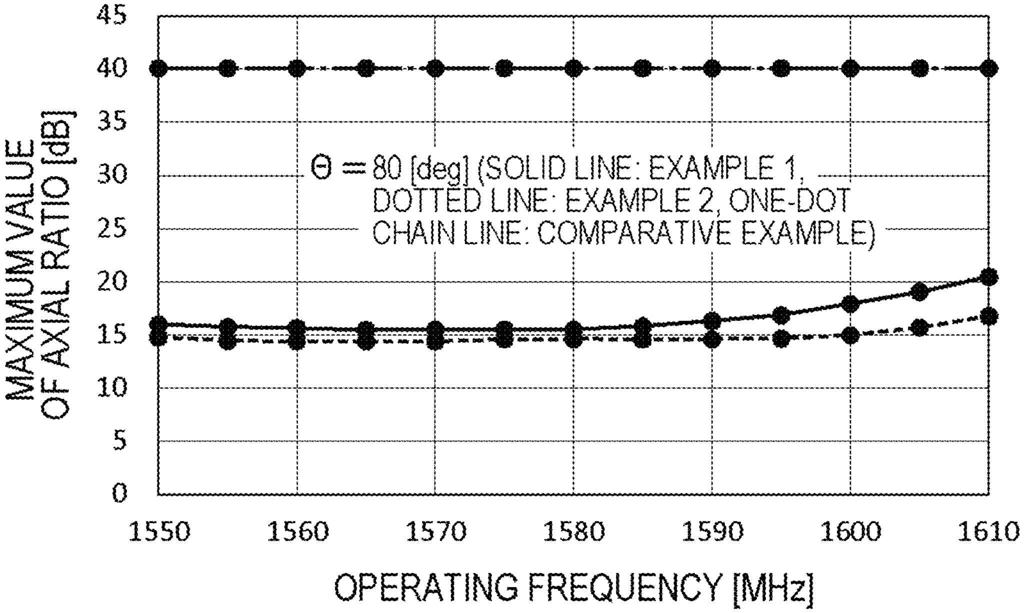
FIG. 29 is a diagram showing electrical characteristics of the first antenna unit 103 in a case where each model of Examples 1 and 2 and a comparative example is arranged on a circular ground plate and showing a simulation result regarding a relationship between an operating frequency [MHz] and a maximum value of an axial ratio in an angular distribution of the axial ratio around the angle φ at the angle θ=80 [deg].

FIGS. 27 to 29 are diagrams showing the electrical characteristics of the first antenna unit 103 in a case where each of the models of Examples 1 to 2 and the comparative example is arranged on a circular ground plate. FIG. 27 is a diagram showing a simulation result regarding a relationship between an operating frequency [MHz] and a maximum value of an axial ratio in an angular distribution of the axial ratio around the angle φ at the angle θ=0 [deg]. FIG. 28 is a diagram showing a simulation result regarding a relationship between an operating frequency [MHz] and a maximum value of an axial ratio in an angular distribution of the axial ratio around the angle φ at the angle θ=60 [deg]. FIG. 29 is a diagram showing a simulation result regarding a relationship between an operating frequency [MHz] and a maximum value of an axial ratio in an angular distribution of the axial ratio around the angle φ at the angle θ=80 [deg].

In each of FIGS. 27 to 29, a horizontal axis represents an operating frequency [MHz]. A vertical axis represents the maximum value [dB] of the axial ratio.

Further, in each of FIGS. 27 to 29, a solid line indicates a simulation result for Example 1. A dotted line indicates a simulation result for Example 2. A one-dot chain line indicates a simulation result for the comparative example.

As can be seen from FIGS. 27 to 29, Examples 1 and 2 all exhibit good axial ratio characteristics, but the comparative example has worse axial ratio characteristics than Examples 1 and 2. This is probably because, as described above, the influence on the electrical characteristics of the circularly polarized antenna (first antenna element 108) differs depending on the length L of the parasitic element according to a grounding state (grounded/ungrounded).

In Example 1, the parasitic elements 111, and 112*a* to 112*c* are ungrounded and have a size equal to or less than ½ of the wavelength of the operating frequency of the circularly polarized antenna as described in the embodiment. In Example 2, the parasitic elements 211, and 212*a* to 212*c* are grounded and have a size equal to or less than ¼ of the wavelength of the operating frequency of the circularly polarized antenna as described in Modification Example 1.

On the other hand, in the comparative example, the parasitic elements are grounded as described above and each have a length in a size equal to or greater than ¼ and equal to or smaller than ½ of the wavelength of the operating frequency of the circularly polarized antenna like the parasitic elements 111, and 112*a* to 112*c* according to Example 1.

From the results of such simulations, it is suggested that by setting the length of the ungrounded parasitic element to ½ or less of the wavelength of the circularly polarized wave, good antenna characteristics can be obtained while arranging a plurality of antenna elements close to each other. In addition, it is suggested that by setting the length of the grounded parasitic element to ¼ or less of the wavelength of the circularly polarized wave, good antenna characteristics can be obtained while arranging a plurality of antenna elements close to each other.

Further, in a case where the parasitic element is ungrounded, since the circuit can be provided in a region of the board located below the parasitic element, it is possible to reduce the size of the antenna device 100 in the left-right direction and the front-rear direction. Further, in a case where the parasitic element is grounded, since the height of the parasitic element can be reduced, it is possible to reduce the size of the antenna device 100 in the up-down direction. By selecting either the grounded or ungrounded parasitic element according to the application of design in this way, it is possible to reduce the size of the antenna device 100 in an appropriate direction.

Modification Examples 5 to 8

In the embodiment, an example in which the first antenna element 108 including a patch antenna is one stage has been described. However, the patch antenna may be multiple stages, for example, multiple stages of the first antenna elements 108 each including a patch antenna may be provided. Furthermore, a parasitic element associated with the first antenna element 108 may be provided.

Moreover, in the embodiment, an example in which the capacitance loading element 115*a* including a meandering shape is divided into two parts on the left and right has been described. However, the shape of the capacitance loading element is not limited to a shape that is divided into two parts on the left and right and for example, may be integrated, or each of the capacitance loading elements divided into the left and right parts may be further divided into multiple parts.

Figure 30:
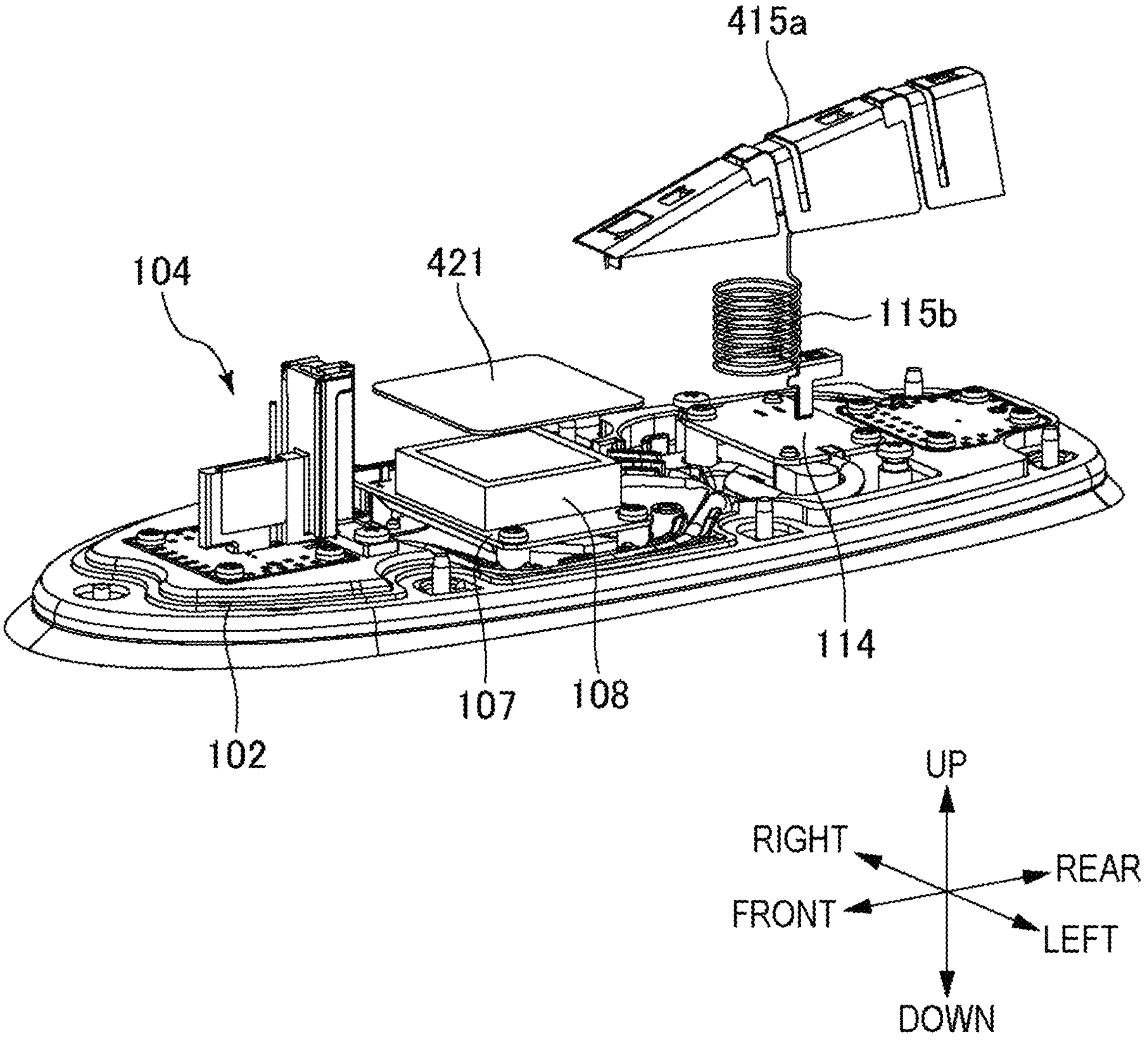
FIG. 30 is a diagram showing configurations of a first antenna element, a third parasitic element, and a capacitance loading element according to Modification Example 5.
Figure 31:
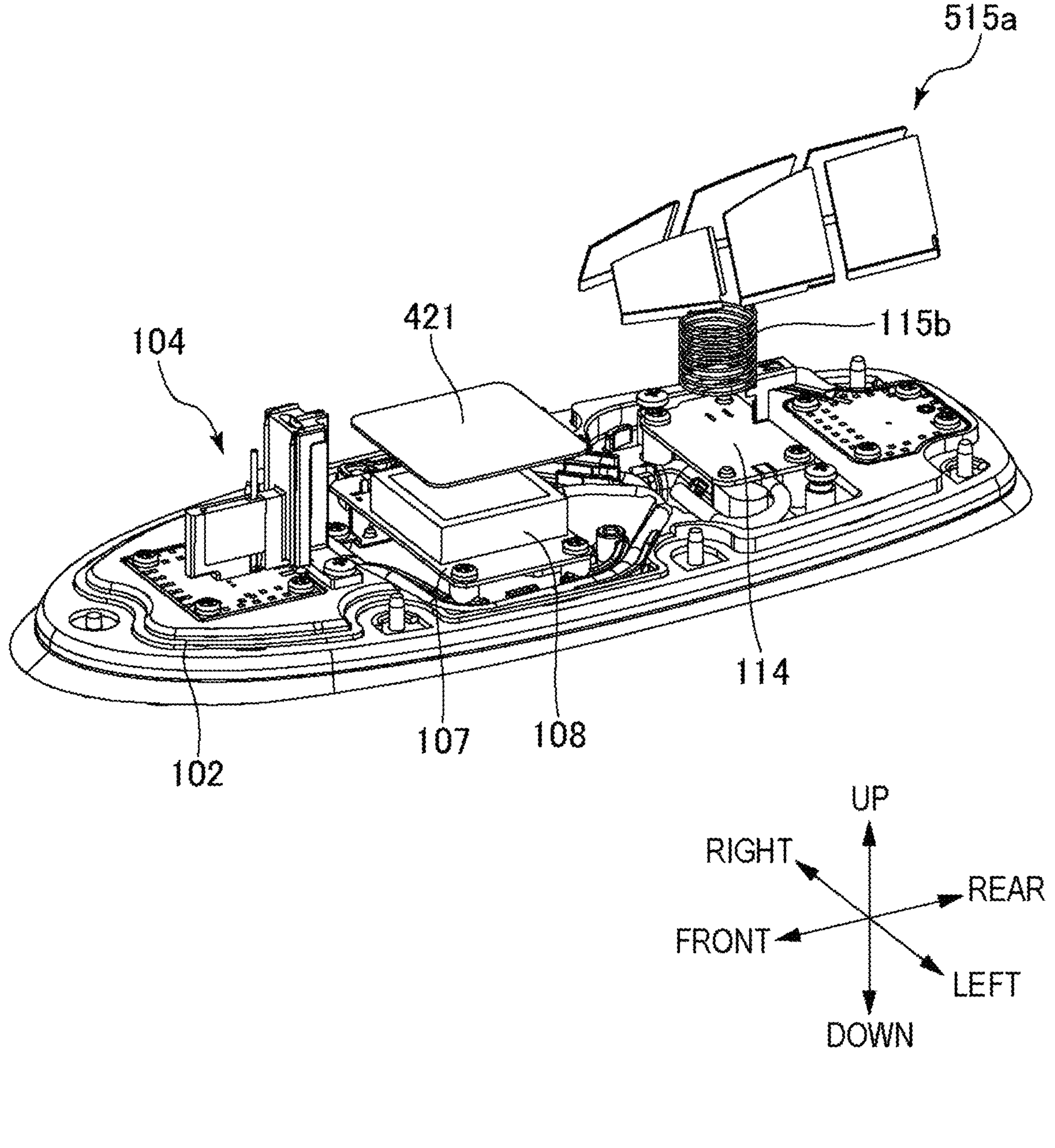
FIG. 31 is a diagram showing configurations of a first antenna element, a third parasitic element, and a capacitance loading element according to Modification Example 6.
Figure 32:
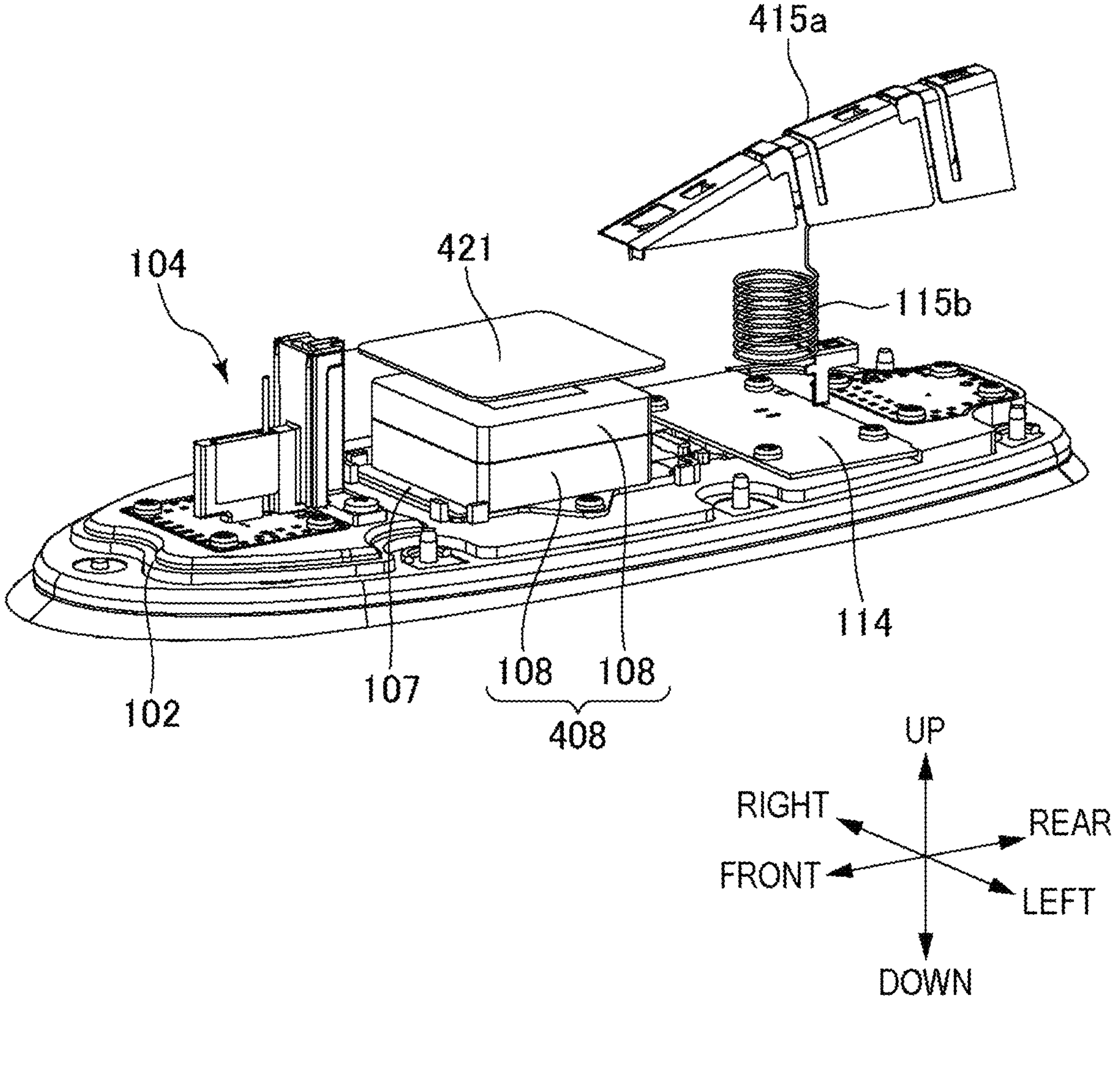
FIG. 32 is a diagram showing configurations of a first antenna element, a third parasitic element, and a capacitance loading element according to Modification Example 7.

FIGS. 30 to 33 show modification examples of these. FIG. 30 shows configurations of the first antenna element 108, a third parasitic element 421, and a capacitance loading element 415*a* according to Modification Example 5. FIG. 31 shows configurations of the first antenna element 108, the third parasitic element 421, and a capacitance loading element 515*a* according to Modification Example 6. FIG. 32 shows configurations of a first antenna element 408, the third parasitic element 421, and the capacitance loading element

Figure 33:
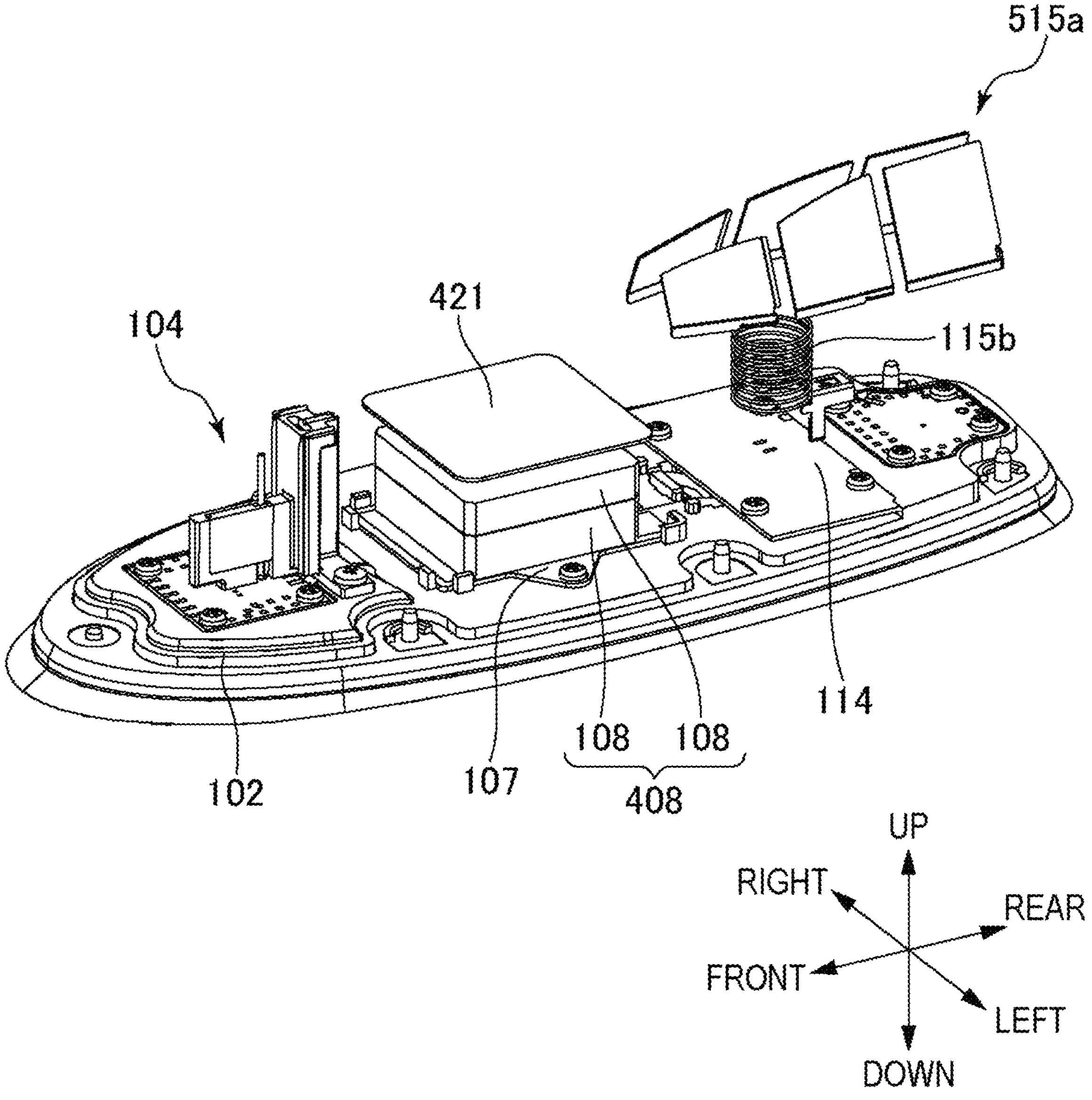
FIG. 33 is a diagram showing configurations of a first antenna element, a third parasitic element, and a capacitance loading element according to Modification Example 8.

415*a* according to Modification example 7. FIG. 33 shows configurations of the first antenna element 408, the third parasitic element 421, and a capacitance loading element 515*a* according to Modification Example 8.

The first antenna element 408, the third parasitic element 421, and the capacitance loading elements 415*a* and 515*a* will be described below. Except for these configurations 408, 421, 415*a*, and 515*a*, each modification example may be the same as the antenna device 100 according to the embodiment.

The first antenna element 408 is an antenna element in which two first antenna elements 108 similar to that of the embodiment are stacked in the up-down direction. Each of the first antenna elements 108 includes a patch antenna.

The third parasitic element 421 is a parasitic element provided above the first antenna element 108 or the first antenna element 408 and has a substantially square or rectangular flat plate shape. Specifically, the third parasitic element 421 is provided above the first antenna element 108 in FIGS. 30 and 31 (Modification Examples 5 and 6) and may be provided above the first antenna element 408 in FIGS. 32 and 33 (Modification Examples 7 and 8).

That is, in the first antenna unit according to Modification Examples 5 and 6, the third parasitic element 421 is added to the first antenna element 108 according to the embodiment. In the first antenna unit according to Modification Examples 7 and 8, the first antenna element 108 according to the embodiment is replaced with the first antenna element 408, and the third parasitic element 421 is added.

In each modification example, the third parasitic element 421 may be provided by an appropriate method, and for example, may be held in the case 101 or fixed to the first board 107, the antenna base 102, and like, through a support which is not shown.

In addition, the third parasitic element 421 is not limited to a flat plate shape and may have an appropriate shape such as a circular flat plate shape, a curved plate shape, or the like. Further, the third parasitic element 421 may be provided as necessary, and in each modification example, if design requirements are satisfied, the third parasitic element 421 may not be provided.

The capacitance loading element 415*a* is an umbrella-shaped capacitance loading element that is integrally formed by connecting top portions thereof and includes a meandering shape.

The capacitance loading element 515*a* is composed of six divided partial elements and is bilaterally symmetrical. The six partial elements that constitute the capacitance loading element 515*a* are arranged three side by side in the front-rear direction on each of the left and right sides. The partial elements arranged side by side on each of the left and right sides are gradually larger toward the rear side. The six partial elements have a structure that electrically connects the left side and the right side at a bottom portion, and the front and rear sides are connected by a structure such as a filter that electrically cuts off the frequency bands used by the first antenna unit and the second antenna unit. Each partial element constituting the capacitance loading element 515*a* has a flat or curved plate shape, but may be changed to an appropriate shape or may include a meandering shape. Further, each partial element may be connected at the top portion or bottom portion, or between the top portion and bottom portion.

These modification examples also have the same effect as the embodiment.

Modification Example 9

Since "for a vehicle" means mountable on the vehicle, the antenna device 100 according to the embodiment is not limited to those attached to the vehicle and includes those brought into the vehicle and used in the vehicle. In addition, in the embodiment, the antenna device is described as an example mounted on a "vehicle" which is a vehicle with wheels, but is not limited thereto. The antenna device may be mounted on a moving object such as, for example, a flying object such as a drone, a probe, a construction machine without wheels, an agricultural machine, and a ship, and may be applied to antenna devices held on various moving objects. The antenna device 100 according to the embodiment has the same effect as the embodiment even when applied to a moving object other than the vehicle.

Although the embodiment and modification examples according to the present invention have been described so far, the present invention is not limited thereto. The present invention includes modified forms of each embodiment, further modified forms of each modification example, combined forms of each embodiment and each modification example, and further modified forms of the combined forms.

According to this specification, the following aspects are provided.

(Aspect 1)

Aspect 1 is an antenna device including: a case; a base forming an accommodation space together with the case; a first antenna element that is accommodated in the accommodation space and that at least transmits or receives a circularly polarized wave; a second antenna element that is arranged close to the first antenna element and that at least transmits or receives a linearly polarized wave; and at least one parasitic element serving as a reflector or a waveguide for the second antenna element.

According to Aspect 1, in the antenna device including the first antenna element and the second antenna element arranged close to the first antenna element, the second antenna element can have a directivity. Therefore, it is possible to obtain good antenna characteristics.

(Aspect 2)

Aspect 2 is the antenna device according to Aspect 1, wherein the parasitic element is arranged between the first antenna element and the second antenna element.

In general, the reflector has a greater influence on the directivity of the second antenna element than the waveguide. Therefore, according to Aspect 2, by using the parasitic element arranged between the first antenna element and the second antenna element as a reflector, the second antenna element can have a directivity while suppressing the influence on the antenna characteristics of the first antenna element. Therefore, it is possible to obtain good antenna characteristics while arranging a plurality of antenna elements close to each other.

(Aspect 3)

Aspect 3 is the antenna device according to Aspect 1 or 2, wherein the parasitic element is arranged within a range of ½ of a wavelength of the linearly polarized wave from an installation position of the second antenna element.

According to Aspect 3, the parasitic element can function as a waveguide or a reflector by serving as a wave source. Therefore, it is possible to improve the antenna characteristics of the second antenna element by providing a desired directivity.

(Aspect 4)

Aspect 4 is the antenna device according to any one of Aspects 1 to 3, wherein the parasitic element includes a first parasitic element and a second parasitic element, the first parasitic element is arranged on a side opposite to the first antenna element with the second antenna element interposed therebetween and functions as a waveguide for the second antenna element, and the second parasitic element is arranged between the first antenna element and the second antenna element and functions as a reflector for the second antenna element.

According to aspect 4, a directivity can be given to the second antenna element by the first parasitic element functioning as a waveguide and the second parasitic element functioning as a reflector. Therefore, it is possible to obtain good antenna characteristics.

(Aspect 5)

Aspect 5 is the antenna device according to Aspect 4, wherein the number of the parasitic elements functioning as the reflector is greater than the number of the parasitic elements functioning as the waveguide.

As described above, in general, the reflector has a greater influence on the directivity of the second antenna element than the waveguide. According to Aspect 5, since more parasitic elements functioning as reflectors are provided than parasitic elements functioning as waveguides, the directivity of the second antenna element can be controlled more precisely. Therefore, it is possible to obtain good antenna characteristics.

(Aspect 6)

Aspect 6 is the antenna device according to any one of Aspects 1 to 5, wherein a length of the parasitic element is ½ or less of a wavelength of the circularly polarized wave when ungrounded, and ¼ or less of the wavelength of the circularly polarized wave when grounded.

According to Aspect 6, the deterioration of the antenna characteristics of the first antenna element can be suppressed by setting the length of the ungrounded parasitic element to ½ or less of the wavelength of the circularly polarized wave transmitted or received by the first antenna element. Further, the deterioration of the antenna characteristics of the first antenna element can be suppressed by setting the length of the grounded parasitic element to ¼ or less of the wavelength of the circularly polarized wave. Therefore, it is possible to obtain good antenna characteristics while arranging a plurality of antenna elements close to each other.

(Aspect 7)

Aspect 7 is the antenna device according to Aspect 6, wherein the length of the parasitic element is 3/10 or less of the wavelength of the circularly polarized wave when ungrounded, and 3/20 or less of the wavelength of the circularly polarized wave when grounded.

According to Aspect 7, the deterioration of the antenna characteristics of the first antenna element can be further suppressed by setting the length of the ungrounded parasitic element to 3/10 or less of the wavelength of the circularly polarized wave transmitted or received by the first antenna element. Further, the deterioration of the antenna characteristics of the first antenna element can be further suppressed by setting the length of the grounded parasitic element to 3/20 or less of the wavelength of the circularly polarized wave. Therefore, it is possible to obtain better antenna characteristics while arranging a plurality of antenna elements close to each other.

(Aspect 8)

Aspect 8 is the antenna device according to any one of Aspects 1 to 8, wherein the parasitic element includes a bent or curved portion.

According to Aspect 8, the parasitic element can be accommodated in the accommodation space while the parasitic element has a sufficient length for exhibiting functions thereof. Therefore, it is possible to reduce the size of the antenna device while improving the antenna characteristics of the second antenna element.

(Aspect 9)

Aspect 9 is the antenna device according to any one of Aspects 1 to 8, wherein the parasitic element is a linear conductor.

In general, the linear parasitic element can suppress the influence on the antenna characteristics of the first antenna element more than the plate-shaped parasitic element. Therefore, according to Aspect 9, a directivity can be given to the second antenna element while suppressing the influence on the antenna characteristics of the first antenna element. Therefore, it is possible to obtain good antenna characteristics while arranging a plurality of antenna elements close to each other.

(Aspect 10)

Aspect 10 is the antenna device according to any one of Aspects 1 to 9, further including a resin holder, wherein the resin holder holds at least one parasitic element.

According to Aspect 10, dimensions of the parasitic element can be reduced by dielectric shortening. Therefore, it is possible to reduce the size of the antenna device.

REFERENCE SIGNS LIST

100 antenna device for a vehicle (antenna device)
101 antenna case
102 antenna base
103 first antenna unit
104, 204 second antenna unit
105 third antenna unit
107 first board
108,408 first antenna element
109 second board
110 second antenna element
111, 211 first parasitic element
**112*a*, 112*b*, 112*c*, 212*a*, 212*b*, 212*c*** second parasitic element
**112*a*_1, 112*b*_1, 112*c*_1** straight portion
**112*a*_2, 112*b*_2, 112*c*_2** bent portion
**112*a*_3, 112*b*_3, 112*c*_3** tip portion
113 resin holder
**113*a*** front holder portion
**113*b*** rear holder portion
**113*b*_1** first holding portion
**113*b*_2** second holding portion
114 third board
**115*a*, 415*a*, 515*a*** capacitance loading element
**115*b*** helical element
318 parasitic element
319 resin portion
320 conductor
421 third parasitic element
P pad
PL circular ground plate
AN circularly polarized antenna
EL parasitic element
F filter

The invention claimed is:

1. An antenna device comprising:
a case;
a base forming an accommodation space together with the case;
a first antenna element that is accommodated in the accommodation space and that at least transmits or receives a circularly polarized wave;
a second antenna element that is arranged close to the first antenna element and that at least transmits or receives a linearly polarized wave; and at least two parasitic elements serving as a reflector or a waveguide for the second antenna element, wherein the at least two parasitic elements include at least one first parasitic element and at least one second parasitic element, the at least one first parasitic element is arranged on a side opposite to the first antenna element with the second antenna element interposed therebetween and functions as a waveguide for the second antenna element, and the at least one second parasitic element is arranged between the first antenna element and the second antenna element and functions as a reflector for the second antenna element.

2. The antenna device according to claim 1, wherein at least one parasitic element among the at least two parasitic elements is arranged within a range of ½ of a wavelength of the linearly polarized wave from an installation position of the second antenna element.

3. The antenna device according to claim 1, wherein a number of the at least one second parasitic element is greater than a number of the at least one first parasitic element.

4. The antenna device according to claim 1, wherein at least one parasitic element among the at least two parasitic elements includes a bent or curved portion.

5. The antenna device according to claim 1, wherein at least one parasitic element among the at least two parasitic elements is a linear conductor.

6. The antenna device according to claim 1, further comprising:

a resin holder configured to hold at least one parasitic element among the at least two parasitic elements.

7. An antenna device comprising:

a case;

a base forming an accommodation space together with the case;

a first antenna element that is accommodated in the accommodation space and that at least transmits or receives a circularly polarized wave;

a second antenna element that is arranged close to the first antenna element and that at least transmits or receives a linearly polarized wave; and at least one parasitic element serving as a reflector or a waveguide for the second antenna element, wherein a length of the at least one parasitic element is ½ or less of a wavelength of the circularly polarized wave when ungrounded, and ¼ or less of the wavelength of the circularly polarized wave when grounded.

8. The antenna device according to claim 7, wherein the at least one parasitic element is arranged between the first antenna element and the second antenna element.

9. The antenna device according to claim 7, wherein the at least one parasitic element is arranged within a range of ½ of a wavelength of the linearly polarized wave from an installation position of the second antenna element.

10. The antenna device according to claim 7, wherein the length of the at least one parasitic element is $\frac{3}{10}$ or less of the wavelength of the circularly polarized wave when ungrounded, and $\frac{3}{20}$ or less of the wavelength of the circularly polarized wave when grounded.

11. The antenna device according to claim 7, wherein the at least one parasitic element includes a bent or curved portion.

12. The antenna device according to claim 7, wherein the at least one parasitic element is a linear conductor.

13. The antenna device according to claim 7, further comprising:

a resin holder configured to hold the at least one parasitic element.

14. An antenna device comprising:

a case;

a base forming an accommodation space together with the case;

a first antenna element that is accommodated in the accommodation space and that at least transmits or receives a circularly polarized wave;

a second antenna element that is arranged close to the first antenna element and that at least transmits or receives a linearly polarized wave; and at least one parasitic element serving as a reflector or a waveguide for the second antenna element, wherein the at least one parasitic element is a linear conductor and includes a bent or curved portion.

15. The antenna device according to claim 14, wherein the at least one parasitic element is arranged between the first antenna element and the second antenna element.

16. The antenna device according to claim 14, wherein the at least one parasitic element is arranged within a range of ½ of a wavelength of the linearly polarized wave from an installation position of the second antenna element.

17. The antenna device according to claim 14, further comprising:

a resin holder configured to hold the at least one parasitic element.

* * * * *